(12) United States Patent
Hiramatsu et al.

(10) Patent No.: US 7,158,538 B2
(45) Date of Patent: Jan. 2, 2007

(54) TRANSMITTING APPARATUS, TRANSMITTING METHOD, RECEIVING APPARATUS, RECEIVING METHOD, AND TRANSMITTING AND RECEIVING SYSTEM

(75) Inventors: Tamihei Hiramatsu, Kanagawa (JP); Toshio Okada, Tokyo (JP)

(73) Assignee: Sony Corporation, Tokyo (JP)

( * ) Notice: Subject to any disclaimer, the term of this patent is extended or adjusted under 35 U.S.C. 154(b) by 978 days.

(21) Appl. No.: 10/092,665

(22) Filed: Mar. 7, 2002

(65) Prior Publication Data

US 2002/0176444 A1 Nov. 28, 2002

(30) Foreign Application Priority Data

Mar. 13, 2001 (JP) .......................... P2001-070207

(51) Int. Cl.
*H04J 3/24* (2006.01)
*H04J 3/02* (2006.01)
*H04L 12/50* (2006.01)

(52) U.S. Cl. .................... 370/473; 370/537; 348/385.1
(58) Field of Classification Search ........ 370/535–538, 370/540, 542, 545, 468, 474, 476, 473, 437
See application file for complete search history.

(56) References Cited

U.S. PATENT DOCUMENTS

| | | | | |
|---|---|---|---|---|
| 4,301,534 A | * | 11/1981 | Genter | 370/510 |
| 5,699,362 A | * | 12/1997 | Makam | 370/437 |
| 5,701,582 A | * | 12/1997 | DeBey | 725/103 |
| 5,751,336 A | * | 5/1998 | Aggarwal et al. | 725/146 |
| 5,922,048 A | * | 7/1999 | Emura | 725/88 |
| 6,018,359 A | * | 1/2000 | Kermode et al. | 725/101 |
| 6,594,052 B1 | * | 7/2003 | Hiramatsu et al. | 704/275 |
| 6,725,267 B1 | * | 4/2004 | Hoang | 709/226 |
| 2002/0083460 A1 | * | 6/2002 | Hejna, Jr. | 725/90 |
| 2004/0136409 A1 | * | 7/2004 | Robinett et al. | 370/535 |
| 2005/0163148 A1 | * | 7/2005 | Kim et al. | 370/437 |

OTHER PUBLICATIONS

Copy of European Search Report.

* cited by examiner

*Primary Examiner*—Ricky Q. Ngo
*Assistant Examiner*—Warner Wong
(74) *Attorney, Agent, or Firm*—Reed Smith LLP

(57) ABSTRACT

The present invention provides a transmitting apparatus, a transmitting method, a receiving apparatus, a receiving method, and a transmitting and receiving system that allow the maximum waiting time for the beginning of a content to be shortened in a near-on-demand transmission.

When the length of a content is denoted by L seconds, the number of channels on which the content is transmitted is denoted by K, and the beginning detecting time of the content on the reception side is denoted by $\lambda$, if L satisfies the relation of $\lambda * (2^{K-1})$ (where L and K are contents), the beginning detecting time $\lambda$ can be decreased to $L/(2^{K-1})$ against L/K as the conventional value.

In reality, the transmission side divides L by the ratio of $(2^{K-1})$ and repeatedly transmits each divided portion (section) on a discrete channel. The reception side connects each divided-portion (section) transmitted on each channel through a buffer memory, with which the maximum waiting time of the minimum divided portion (section) placed at the beginning of the content is used.

18 Claims, 22 Drawing Sheets

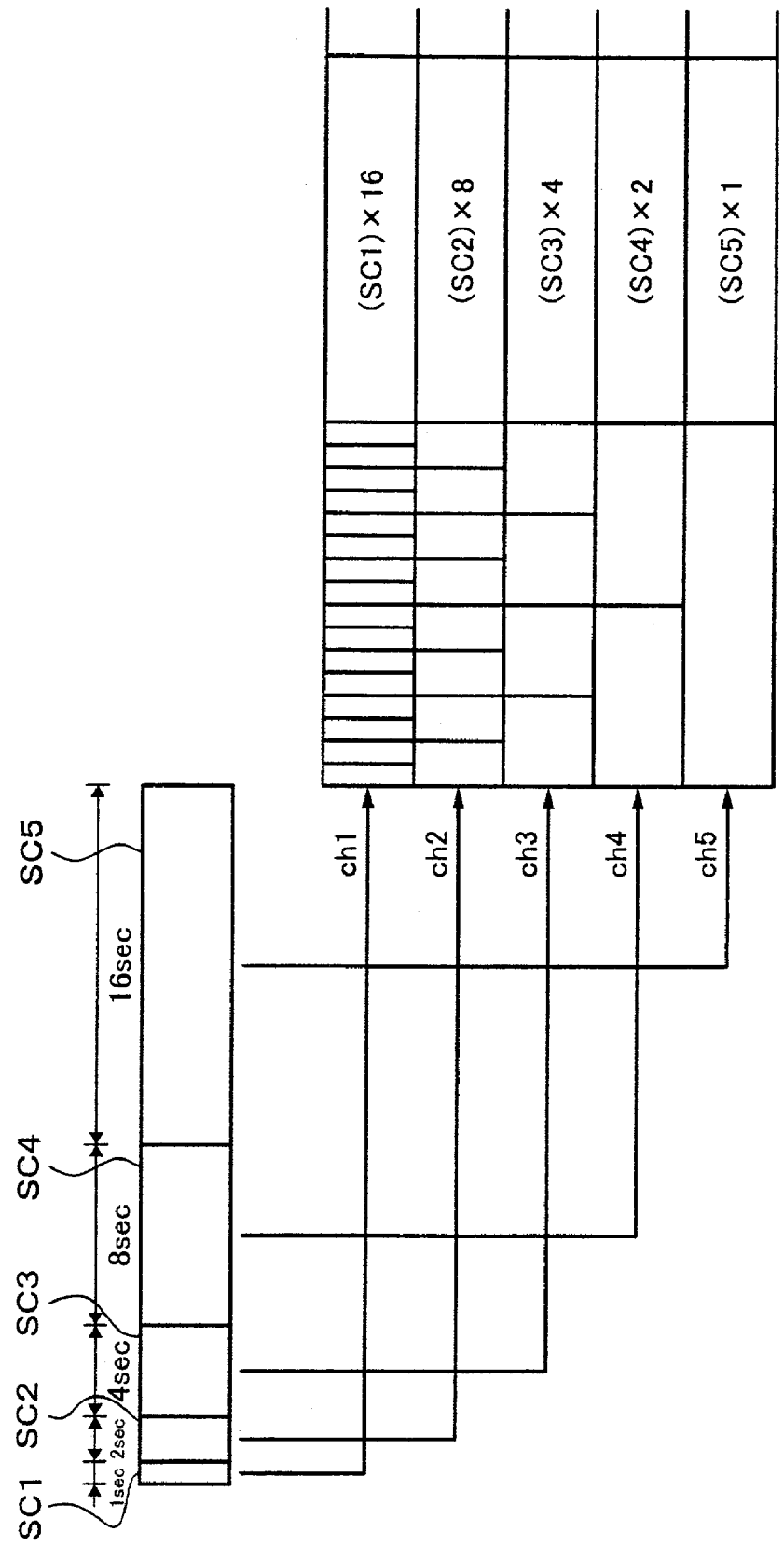

| | ADDRESS |
|---|---|
| BSC1 | 0 |
| BSC2 | 4E20 |
| BSC3 | EA60 |
| BSC4 | 222E0 |
| BSC5 | 493E0 |
| BSC6 | 975E0 |
| BSC7 | 1339E0 |

| | ADDRESS |
|---|---|
| ESC1 | 4E1F |
| ESC2 | EA5F |
| ESC3 | 222DF |
| ESC4 | 493DF |
| ESC5 | 975DF |
| ESC6 | 1339DF |
| ESC7 | 26C1DF |

| |
|---|
| ARSC1 |
| ARSC2 |
| ARSC3 |
| ARSC4 |
| ARSC5 |
| ARSC6 |
| ARSC7 |

0.3125 µs (3.2Mbps)

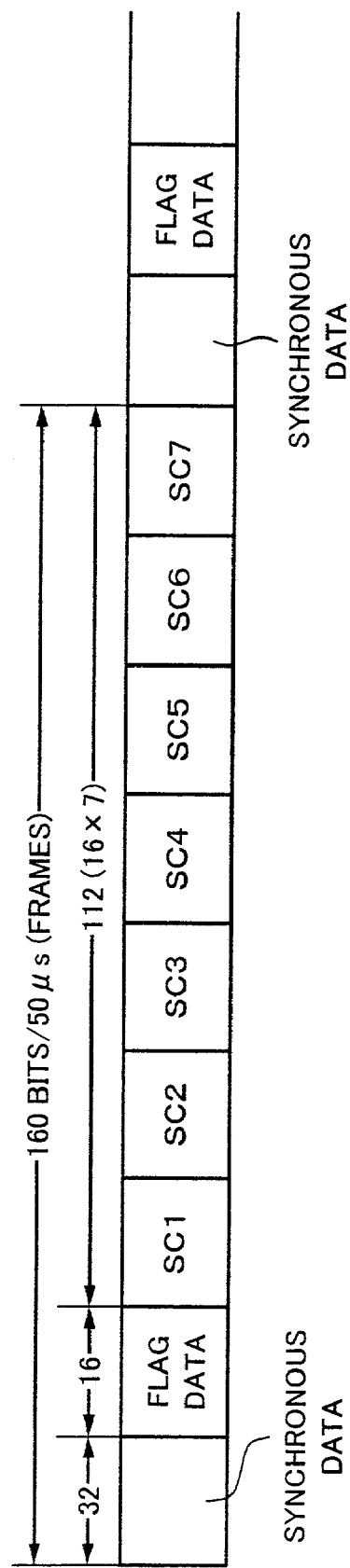

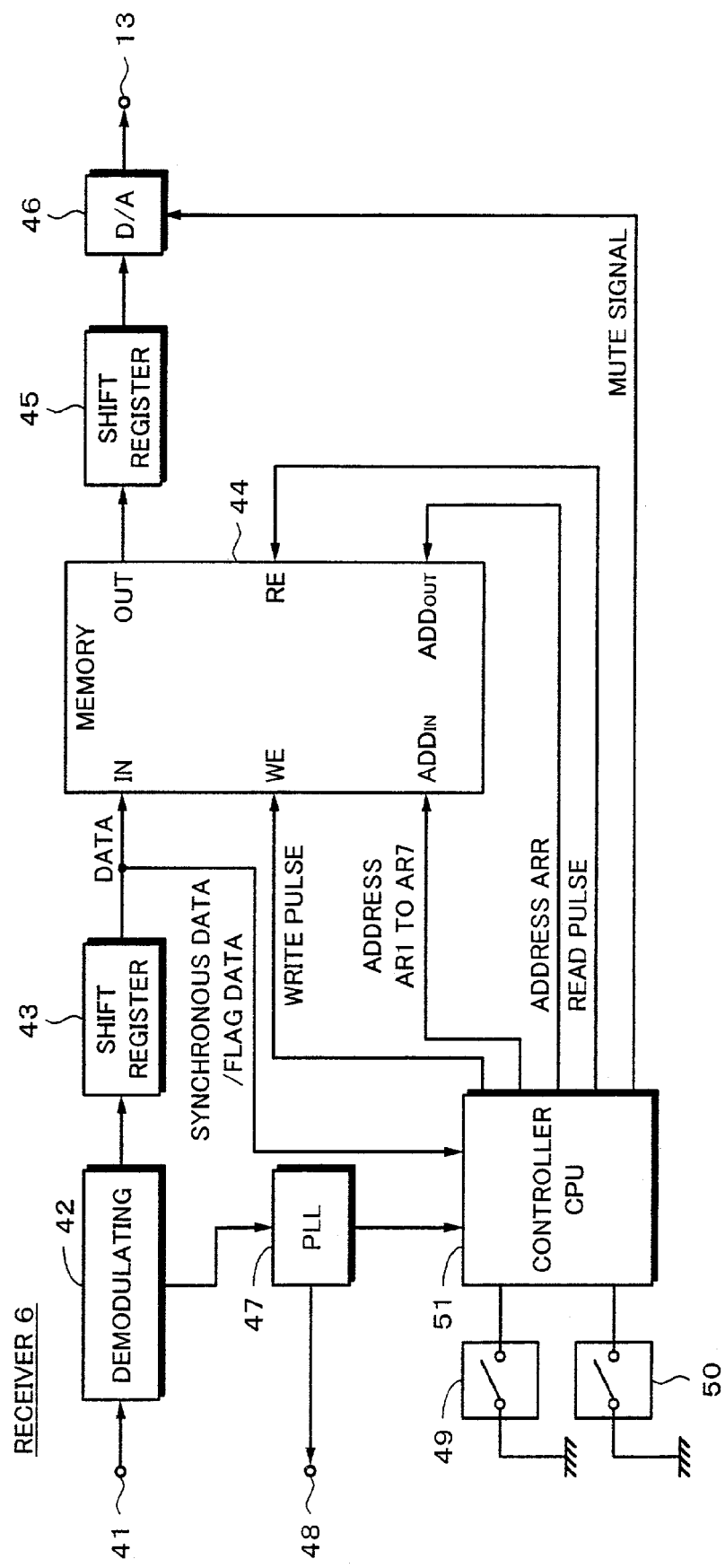

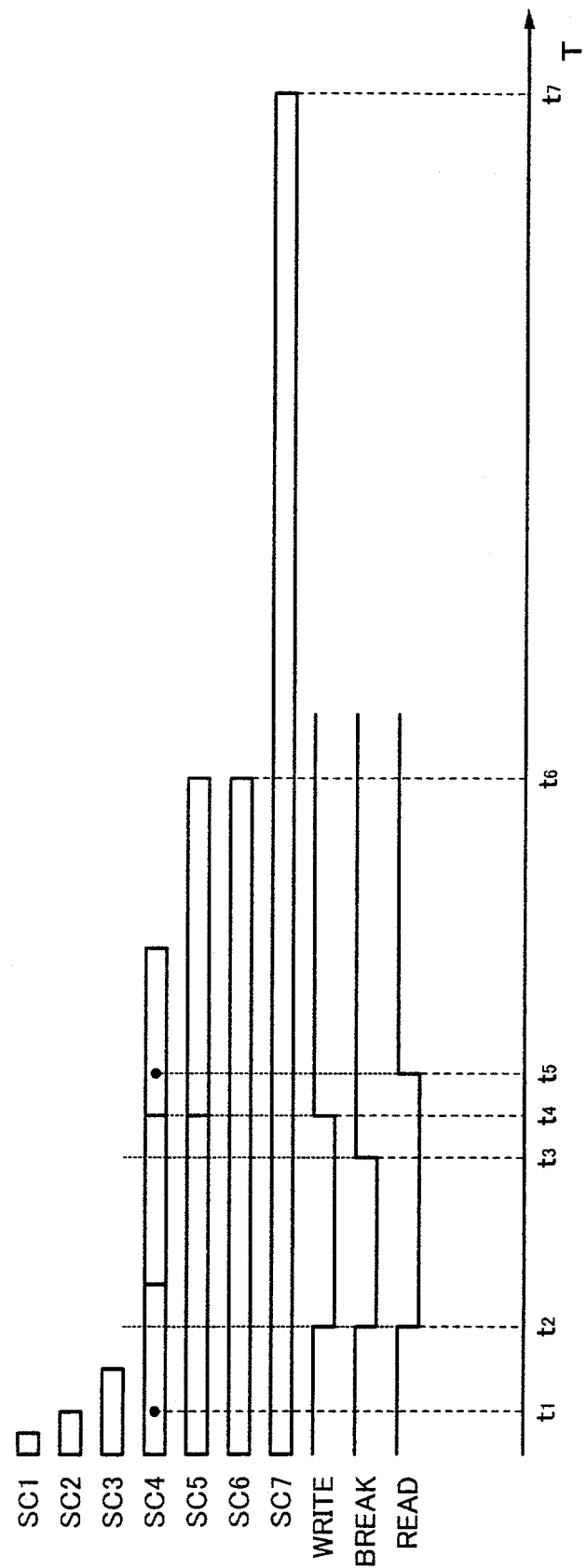

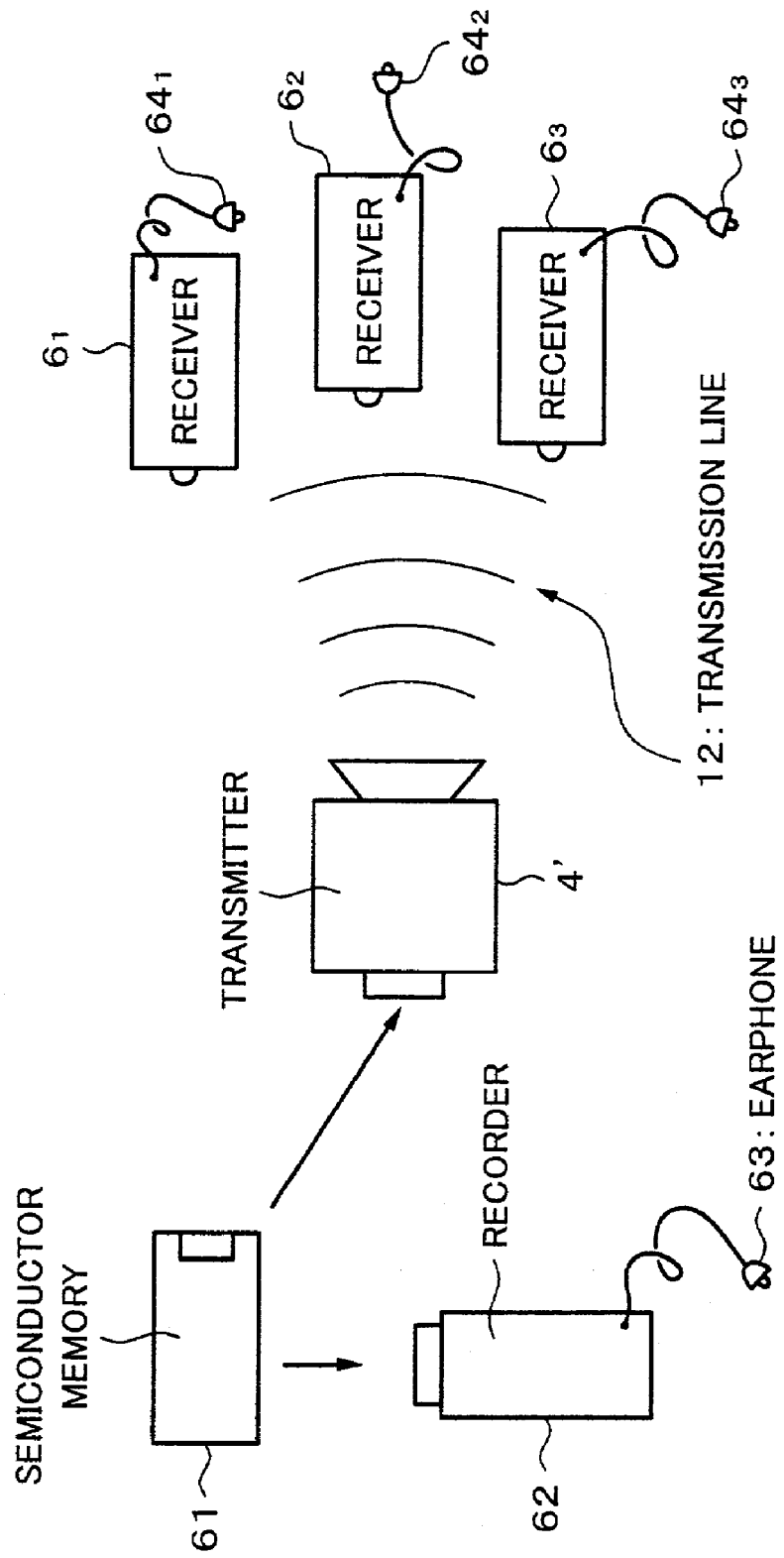

| | | LENGTH OF SECTION |
|---|---|---|
| SC1 | | 1sec |
| SC2 | | 2sec |
| SC3 | | 4sec |
| SC4 | | 8sec |
| SC5 | | 16sec |
| SC6 | | 32sec |
| SC7 | | 64sec |

US 7,158,538 B2

TRANSMITTING APPARATUS, TRANSMITTING METHOD, RECEIVING APPARATUS, RECEIVING METHOD, AND TRANSMITTING AND RECEIVING SYSTEM

BACKGROUND OF THE INVENTION

1. Field of the Invention

The present invention relates to a transmitting apparatus, a transmitting method, a receiving apparatus, a receiving method, and a transmitting and receiving system that allow data transmitted from a transmission side to be quickly reproduced from the beginning of the data on a reception side.

2. Description of the Related Art

In a CATV, a so-called NOD (Near On Demand) system of which a content for example data of a movies requested by a user is transmitted from the beginning thereof has been used. The NOD system is generally categorized as a single channel system shown in FIG. 1 and a multiple channel system shown in FIG. 2.

In an example of the single channel system shown in FIG. 1, a content of one second is repeatedly transmitted from the transmission side. At that point, when the reception side waits for a maximum of one second, the reception side can reproduce the content from the beginning. In other words, in the single channel system, the maximum waiting time of a user who has a receiver is one second. When the user waits for one second, he or she can see and/or listen to the content from the beginning. However, in the single channel system, when the length of a content is 10 seconds, the maximum waiting time for the user becomes 10. Likewise, when the length of a content is 30 seconds, the maximum waiting time for the user becomes 30 seconds.

On the other hand, in an example of the multiple channel system shown in FIG. 2, five channels are provided for repeatedly transmitting a content of 31 seconds from the transmission side. In the multiple channel system, the beginning of a content transmitted on one channel is different from that on the immediately adjacent channel by 6.2 seconds (31 seconds/5 channels=6.2 seconds). In other words, when the number of channels is denoted by n and the length of a content is denoted by L, the maximum waiting time becomes L/n seconds. In this case, on the reception side, a content is reproduced from the beginning with a maximum waiting time of 6.2 seconds. In other words, in the multiple channel system, a user who has a receiver can see and/or listen to a content from the beginning with a maximum waiting time of up to 6.2 seconds.

Originally, the technology of the NOD system was designed so that a content for example data of a movie whose broadcast time is around one to two hours is repeatedly transmitted using a plurality of channels and the reception side can see a requested movie from the beginning with a maximum waiting time of 15 minutes on a selected channel. The NOD system has benefits of which a one-way communication line can be used and a complicated control is not required on the transmission side.

In addition, another technology of which the number of channels is increased to more than several tens and the total length of each content is shortened to several minutes is also known. According to this technology, the user can see and/or listen to a content from the beginning with a waiting time of several seconds.

In both the single channel system and the multiple channel system, the maximum waiting time for any portion of a content is constant. For example, when a content of 60 seconds is transmitted with 60 channels, any portion of the content (including the beginning thereof) can be accessed with a maximum waiting time of one second. In other words, in both the single channel system and the multiple channel system, a content is accessed at equal speed.

However, in both the single channel system and the multiple channel system, there is the following relation of proportional:

(waiting time)×(number of channels)=(total length of content)

Thus, when the maximum waiting time of the same content is shortened, the number of channels (capacity of transmission line) is proportionally increased. Alternatively, assuming that the total length of a content is increased and that the maximum waiting time is not changed, the number of channels should be proportionally increased.

OBJECTS AND SUMMARY OF THE INVENTION

Therefore, an object of the present invention is to provide a transmitting apparatus, a transmitting method, a receiving apparatus, a receiving method, and a transmitting and receiving system that allow a maximum waiting time for the beginning of a content to be shortened.

A first aspect of the present invention is a transmitting apparatus for transmitting a content, comprising a record medium on which at least one content has been written, a section generating means for generating section 1 to section n (where n is an integer) in such a manner that when the content is divided into the section 1 to the section n in a predetermined ratio, the length of a section on the beginning side is smaller than the length of a section on the end side, a signal formatting means for formatting a signal in such a manner that the length of data of each of the section 1 to the section n is the same in each of channel 1 to channel n, a multiplexing means for multiplexing the formatted signal, and a transmitting means for transmitting the multiplexed signal.

A second aspect of the present invention is a transmitting method for transmitting a content, comprising the steps of writing at least one content to a record medium, generating section 1 to section n (where n is an integer) in such a manner that when the content is divided into the section 1 to the section n in a predetermined ratio, the length of a section on the beginning side is smaller than the length of a section on the end side, formatting a signal in such a manner that the length of data of each of the section 1 to the section n is the same in each of channel 1 to channel n, multiplexing the formatted signal, and transmitting the multiplexed signal.

A third aspect of the present invention is a receiving apparatus for receiving a signal from a transmitting apparatus and reproducing the received signal, the transmitting apparatus having a first record medium on which at least one content has been written, section generating means for generating section 1 to section n (where n is an integer) in such a manner that when the content is divided into the section 1 to the section n in a predetermined ratio, the length of a section on the beginning side is smaller than the length of a section on the end side, signal formatting means for formatting a signal in such a manner that the length of data of each of the section 1 to the section n is the same in each of channel 1 to channel n, multiplexing means for multiplexing the formatted signal, and transmitting means for transmitting the multiplexed signal, the receiving apparatus comprising a separating means for separating the received signal, a detecting means for detecting beginning data of each of the section 1 to the section n from the separated signals, a second record medium on which the beginning data of each of the section 1 to the section n is written to channel 1 to channel n, respectively, a reading means for successively reading data of the section 2 to the section n from the second record medium after the beginning data of the section 1 is detected, the data of the section 1 is written to the second record medium starting from the beginning data of the section 1, the data of the section 1 is read from the second record medium, and the data of the section 1 is read from the second record medium, and a reproducing means for reproducing the data of the section 1 to the section n that has been read from the second record medium.

A fourth aspect of the present invention is a receiving method for receiving a signal from a transmitting apparatus and reproducing the received signal, the transmitting apparatus having a first record medium on which at least one content has been written, section generating means for generating section 1 to section n (where n is an integer) in such a manner that when the content is divided into the section 1 to the section n in a predetermined ratio, the length of a section on the beginning side is smaller than the length of a section on the end side, signal formatting means for formatting a signal in such a manner that the length of data of each of the section 1 to the section n is the same in each of channel 1 to channel n, multiplexing means for multiplexing the formatted signal, and transmitting means for transmitting the multiplexed signal, the receiving method comprising the steps of separating the received signal, detecting beginning data of each of the section 1 to the section n from the separated signals, writing the beginning data of each of the section 1 to the section n to channel 1 to channel n, respectively, to a second record medium, successively reading data of the section 2 to the section n from the second record medium after the beginning data of the section 1 is detected, the data of the section 1 is written to the second record medium starting from the beginning data of the section 1, the data of the section 1 is read from the second record medium, and the data of the section 1 is read from the second record medium, and reproducing the data of the section 1 to the section n that has been read from the second record medium.

A fifth aspect of the present invention is a transmitting and receiving system having a transmitting apparatus for transmitting a content and at least one receiving apparatus for receiving the transmitted content and reproducing the received content, wherein the transmitting apparatus comprises a first record medium on which at least one content has been written, a section generating means for generating section 1 to section n (where n is an integer) in such a manner that when the content is divided into the section 1 to the section n in a predetermined ratio, the length of a section on the beginning side is smaller than the length of a section on the end side, a signal formatting means for formatting a signal in such a manner that the length of data of each of the section 1 to the section n is the same in each of channel 1 to channel n, a multiplexing means for multiplexing the formatted signal, and a transmitting means for transmitting the multiplexed signal, wherein the receiving apparatus comprises a separating means for separating the received signal, a detecting means for detecting beginning data of each of the section 1 to the section n from the separated signals, a second record medium on which the beginning data of each of the section 1 to the section n is written to channel 1 to channel n, respectively, a reading means for successively reading data of the section 2 to the section n from the second record medium after the beginning data of the section 1 is detected, the data of the section 1 is written to the second record medium starting from the beginning data of the section 1, the data of the section 1 is read from the second record medium, and the data of the section 1 is read from the second record medium, and a reproducing means for reproducing the data of the section 1 to the section n that has been read from the second record medium, wherein the transmitting apparatus transmits the content that has been divided by n to the receiving apparatus through a transmission line, and wherein when the receiving apparatus detects beginning data of the received content, the receiving apparatus reproduces the content.

In the transmitting apparatus, at least one content has been written on the record medium. Section 1 to section n (where n is an integer) are generated in such a manner that when the content is divided into the section 1 to the section n in a predetermined ratio, the length of a section on the beginning side is smaller than the length of a section on the end side. A signal is formatted in such a manner that the length of data of each of the section 1 to the section n is the same in each of channel 1 to channel n. The formatted signal is multiplexed. The multiplexed signal is transmitted. In at least one receiving apparatus that receives the signal trough the transmission line, the received signal is separated. Beginning data of each of the section 1 to the section n is detected from the separated signals. The beginning data of each of the section 1 to the section n is written to channel 1 to channel n, respectively, on the record medium. Data of the section 2 to the section n is read from the second record medium after the beginning data of the section 1 is detected, the data of the section 1 is written to the second record medium starting from the beginning data of the section 1, the data of the section 1 is read from the second record medium, and the data of the section 1 is read from the second record medium. The data of the section 1 to the section n is read from the second record medium. The data of the section 1 to the section n is reproduced. When the receiving apparatus detects beginning data of the received content, the receiving apparatus reproduces the content.

These and other objects, features and advantages of the present invention will become more apparent in light of the following detailed description of a best mode embodiment thereof, as illustrated in the accompanying drawings.

BRIEF DESCRIPTION OF THE DRAWINGS

FIG. 6 is a schematic diagram for explaining an example of a signal format according to the present invention;

FIGS. 10A, 10B, and 10C are schematic diagrams for explaining an example of addresses used in the transmitting apparatus according to the present invention;

FIG. 11 is a schematic diagram for explaining an example of a transmission signal format according to the present invention;

FIG. 13 is a block diagram showing the structure of a receiving apparatus according to an embodiment of the present invention;

FIG. 16 is a schematic diagram for explaining an example of the system of the present invention in the case that a transmission line is disconnected;

FIG. 18 is a schematic diagram for explaining an example of which a semiconductor memory is used as a record medium of the transmitting apparatus according to the present invention;

DETAILED DESCRIPTION OF THE PREFERRED EMBODIMENTS

Figure 1:
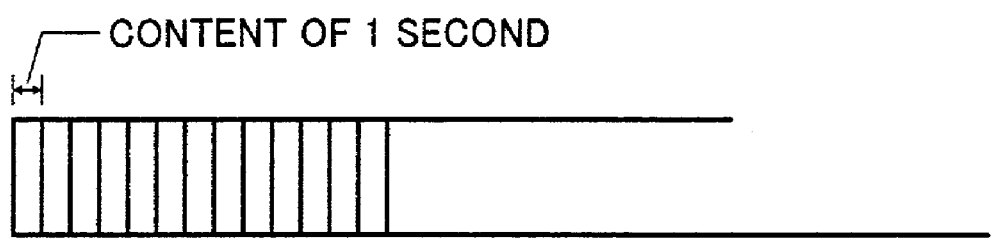
FIG. 1 is a schematic diagram for explaining a single channel NOD system.
Figure 2:
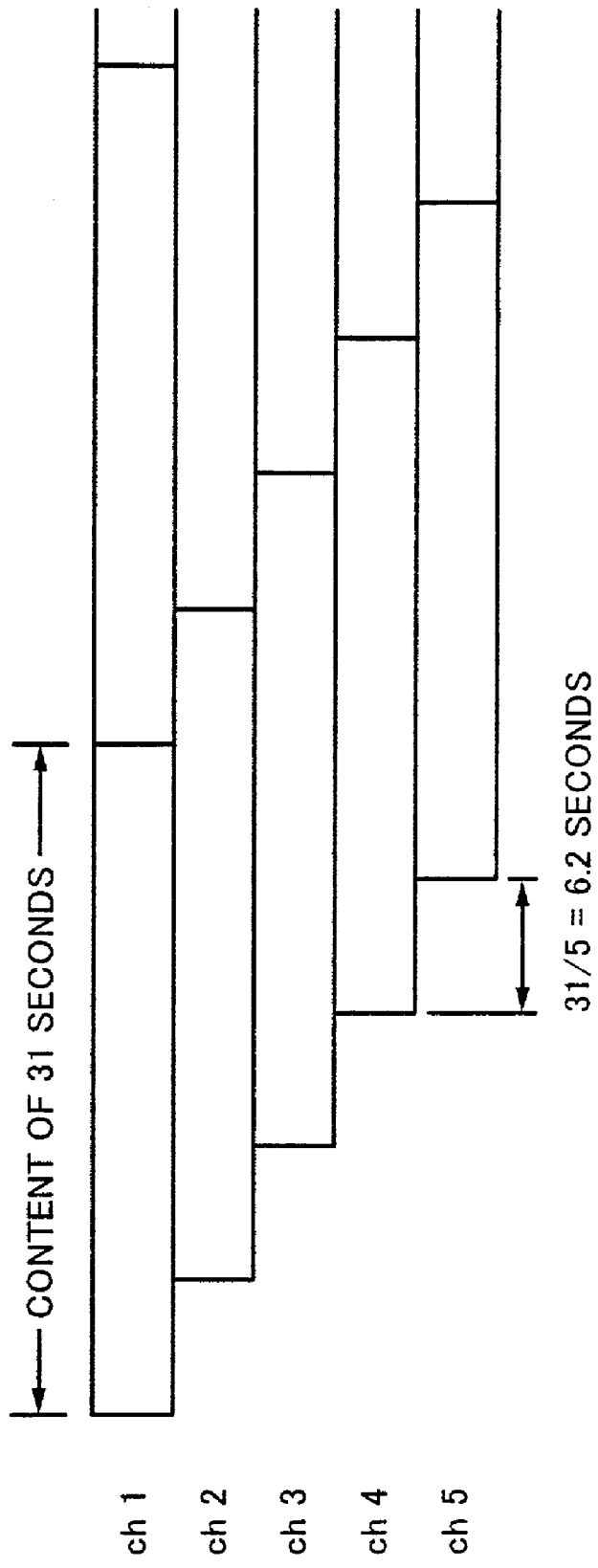
FIG. 2 is a schematic diagram for explaining a multiple channel NOD system.
Figure 3:
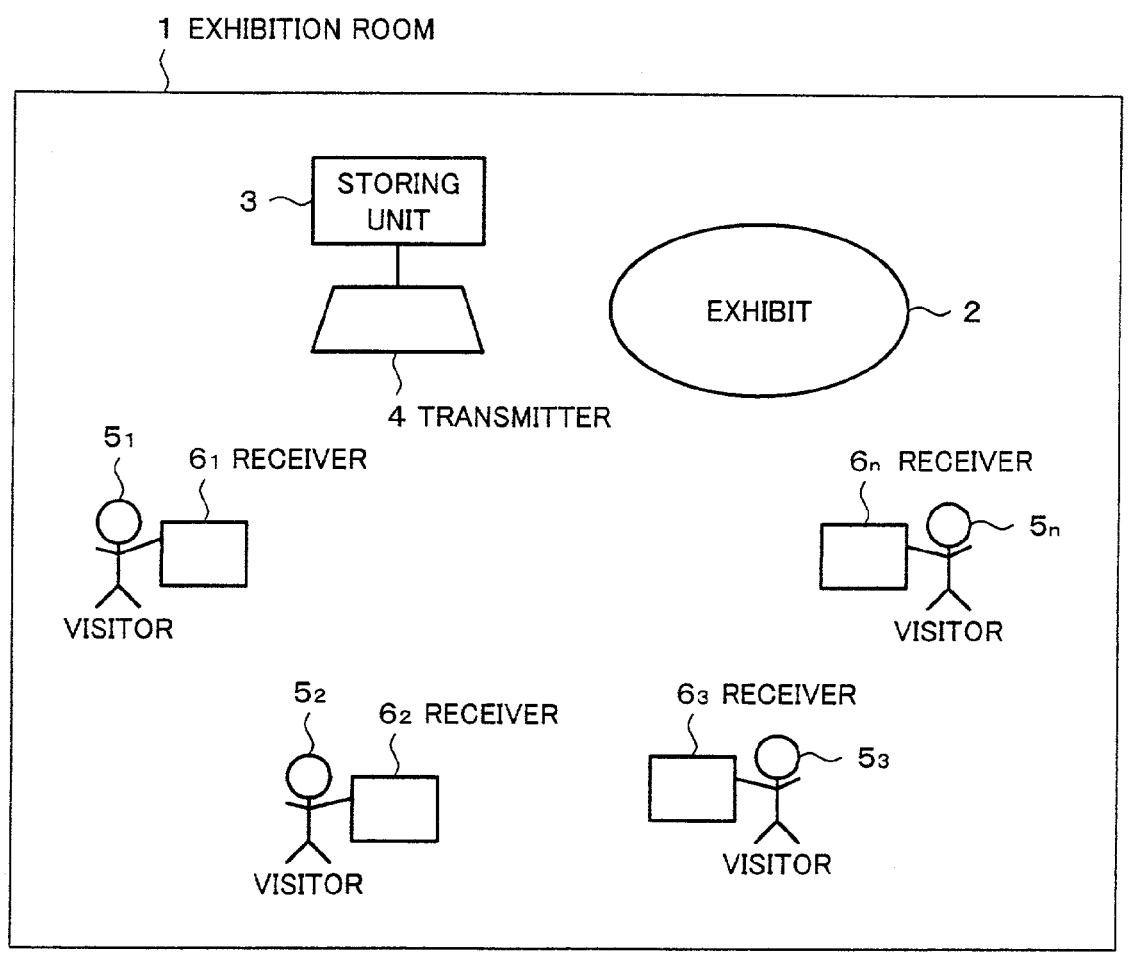
FIG. 3 is a schematic diagram showing the structure of a system according to an embodiment of the present invention.

Next, with reference to the accompanying drawings, an embodiment of the present invention will be described. To prevent redundant description, portions having a similar function are denoted by similar reference numerals. To allow the reader to easily understand the present invention, an outline thereof will be described with reference to FIG. 3. FIG. 3 shows an example of a room of an exhibition. In an exhibition room designated by reference numeral 1, an exhibit 2 is exhibited. A comment (content) about the exhibit 2 is pre-stored in a storing unit 3. Alternatively, a comment may be stored in a HDD (Hard Disk Drive) instead of the storing unit 3. The comment may be stored in a detachable semiconductor memory. The stored comment is always transmitted in the exhibition room 1 by a transmitter 4.

Receivers $6_1$, $6_2$, $6_3$, . . . , and $6_n$ (generally referred to as receiver 6) are pre-provided for visitors $5_1$, $5_2$, $5_3$, . . . , $5_n$ Of the exhibition (generally referred to as visitor 5). With the receiver 6, the visitor 5 can listen to the comment about the exhibit 2.

When the visitor 5 who has the receiver 6 enters the exhibition room 1, the receiver 6 receives the comment about the exhibit 2 from the transmitter 4. The receiver 6 reproduces audio data of the received comment from the beginning. At that point, when the visitor 5 enters the exhibition room 1 and sees the exhibit 2, the receiver 6 reproduces the comment about the exhibit 2 from the beginning.

Figure 4:
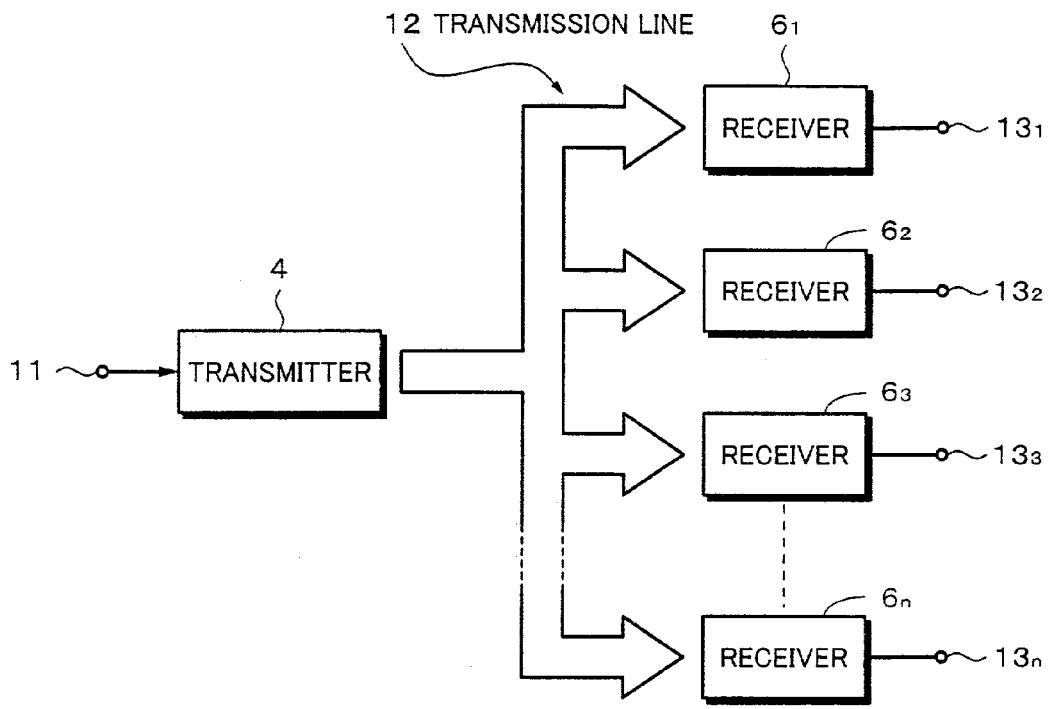
FIG. 4 is a schematic diagram showing the structure of a transmitting and receiving system according to an embodiment of the present invention.

Next, with reference to FIG. 4, the system according to the embodiment will be described in brief. A comment stored in the storing unit 3 is supplied as analog audio data to the transmitter 4 through an input terminal 11. The transmitter 4 converts the supplied analog audio data into a signal format that will be described later and transmits the converted signal to the receiver 6 through a transmission line 12. The transmission line 12 is for example a one-way transmission line on which a signal is transmitted from the transmitter 4 to the receiver 6. The receivers $6_1$, $6_2$, $6_3$, . . . , $6_n$ shown in FIG. 4 are provided with terminals $13_1$, $13_2$, $13_3$, . . . , $13_4$, respectively, (hereinafter these terminals are generally referred to as terminal 13).

The receiver 6 detects the beginning of a content from the received signal, temporarily successively writes the content from the beginning to a record medium, and reads the content therefrom. In reality, the receiver 6 converts the received signal into analog audio data and outputs the converted analog audio data to a speaker, an earphone, or a headset through the terminal 13 so that the visitor can listen to the audio data. As shown in FIG. 4, according to the embodiment, a signal can be transmitted from one transmitter 4 to a plurality of (an unlimited number of) receivers 6 through the transmission line 12.

Figure 5A:
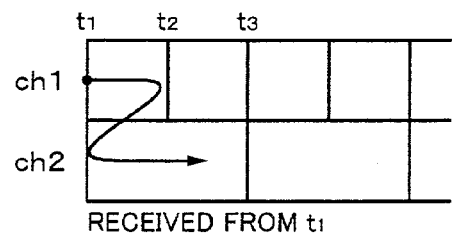
FIGS. 5A and 5B are schematic diagrams for explaining examples of signal formats according to the present invention.
Figure 5B:
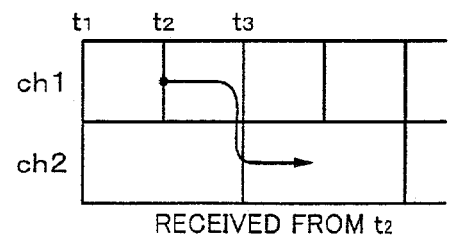

Next, with reference to FIGS. 5A, 5B, and 6, a signal format of a signal transmitted from the transmitter 4 to the receiver 6 will be described. According to an embodiment of the present invention, it is assumed that the maximum waiting time necessary for reproducing the beginning of a content is one second. Thus, the content is divided for one second from the beginning. Hereinafter, a portion into which a content is divided is referred to as section (SC). When a content is divided by n, the divided portions are successively referred to as section 1, section 2, section 3, . . . , section n.

To cause the maximum waiting time of a content to be one second, a channel on which the section 1 of which data for one second is divided from the beginning of the content is repeatedly transmitted is provided. According to the embodiment, since channels on which n-divided sections are repeatedly transmitted are provided, n channels are required. For example, the section 1 is repeatedly transmitted on the channel 1. The section 2 is repeatedly transmitted on the channel 2. Likewise, the section n is repeatedly transmitted on the channel n.

It is not necessary to designate one second as a maximum waiting time to sections other than the section 1. However, the sections 1 and 2 should be successive so that after the section 1 has been completely reproduced, the beginning of the section 2 is reproduced. Likewise, the other sections should be successive so that after a particular section has been completely reproduced, the beginning of the next section is reproduced.

Next, to allow the reader to easily understand the description, the section 1 and the section 2 that is reproduced thereafter will be described. After the beginning of the section 1 until the end thereof, it takes one second. Thus, it is necessary to allow the section 2 to be reproduced from the beginning within one second after the section 2 has been received. Assuming that the beginning time of the section 1 and the beginning time of the section 2 are the same at time t1 as shown in FIG. 5A, the permissible length of the section 2 is up to two seconds.

When the beginnings of the section 1 the section 2 are received at time t1, the section 1 is written to the record medium. In addition, the section 1 is read from the record medium. The section 2 is written to the record medium. After the section 1 has been completely reproduced at time t2, the section 2 that is preceded by the section 1 is reproduced. At that point, the section 2 written to the record medium is read and reproduced. Thus, in such a manner, even if the section 1 is received and reproduced at time t1, the section 1 and section 2 can be successively reproduced without a break.

When the reception of the section 1 starts from the beginning at time t2, the section 1 is written to the record medium. In addition, the section 1 is read from the record medium. In the example shown in FIG. 5B, when the section 1 has been completely received at time t3, it is necessary to start receiving the section 2 from the beginning. In other words, it is necessary to form a signal format so that the section 1 is received, written, and read until time t3 and the section 2 is received, written, and read at time t3. As a result, after the section 1 is received, written, and read at time t2, the sections can be successively reproduced without a break.

Thus, it is necessary to allow the beginning of the section 2 to be received at time t3. Since the period of the section 1 from time t1 to time t3 matches the period of the section 2, assuming that the length of the section 1 is one second, the length of the section 2 becomes two seconds.

Likewise, the lengths of the section 3, the section 4, . . . , the section n can be obtained. In other words, the relation between the length of the section m (1<m<n) and the length of the section m+1 can be expressed as follows:

(length of section $m$)×2=(length of section $m$+1)

Thus, the length of the section 3 becomes four seconds. The length of the section 4 becomes eight seconds . . . . Likewise, the length of the section n becomes $2^{(n-1)}$ seconds.

Thus, assuming that the number of channels is n and the maximum waiting time is one second, the length L of a content can be expressed as follows:

$$L = \sum_{m=1}^{n} 2^{(m-1)} \quad (1)$$

In reality, with reference to FIG. 6, an example of a content of 31 seconds will be described. Assuming that the number of channels is 5 and that the maximum waiting time is one second, the content of 31 seconds is divided into five sections of a section of one second, a section of two seconds, a section of four seconds, a section of eight seconds, and a section of 16 seconds. In this example, the sections of one second, the section of two seconds, the section of four seconds, the section of eight seconds, and the section of 16 seconds are referred to as section 1, section 2, section 3, section 4, and section 5, respectively. In this example, the section 1 is repeatedly transmitted on channel 1. The section 2 is repeatedly transmitted on channel 2. The section 3 is repeatedly transmitted on channel 3. The section 4 is repeatedly transmitted on channel 4. The section 5 is repeatedly transmitted on channel 5.

In such a signal format of a signal transmitted from the transmitter 4, the receiver 6 can detect the channel 1 (section 1) that is the beginning of a content from a plurality of channels with a maximum waiting time of one second. The section 1 on the channel 1 is temporarily written to the record medium from the beginning and read therefrom.

Figure 7:
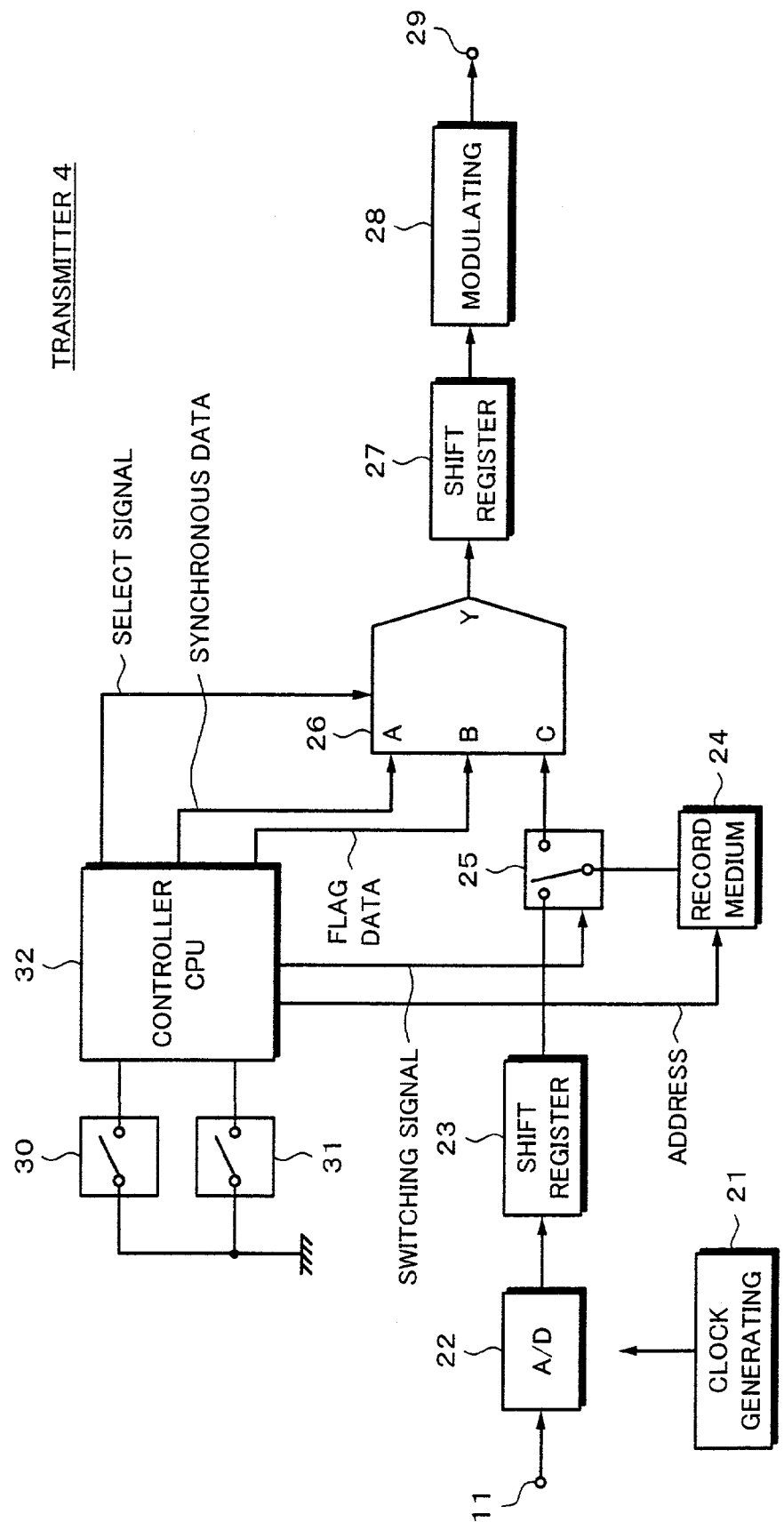
FIG. 7 is a block diagram showing the structure of a transmitting apparatus according to an embodiment of the present invention.

Next, with reference to a block diagram shown in FIG. 7, the internal structure of the transmitter 4 will be described. First of all, the specifications of the transmitter 4 will be described. It is assumed that a content transmitted from the transmitter 4 is audio data whose total length is 127 seconds. In addition, it is assumed that the audio data is a PCM (Pulse Code Modulation) signal whose sampling frequency is 20 kHz and whose data length is 16 bits. In this example, it is assumed that the maximum waiting time on the receiver 6 side is one second.

In this example, the content is composed of a total of seven sections that are section 1 of one second, section 2 of two seconds, section 3 of four seconds, section 4 of eight seconds, section 5 of 16 seconds, section 6 of 32 seconds, and section 7 of 64 seconds.

A clock generating circuit 21 is composed of for example a crystal oscillator. In the example, a clock signal of 20 kHz is supplied to all portions of the transmitter 4. In other words, the clock generating circuit 21 controls the entire transmitter 4. As was described above, analog audio data is supplied to the transmitter 4 through the input terminal 11. An A/D (Analog/Digital) converting circuit 22 converts the analog audio data supplied from the input terminal 11 into a PCM signal. In other words, the A/D converting circuit 22 converts the analog audio data into digital audio data. The converted digital audio data is supplied from the A/D converting circuit 22 to a shift register 23. The shift register 23 converts the supplied digital audio data as a serial signal into a parallel signal. The parallel digital audio data as the parallel signal is supplied to a record medium 24 through a switch circuit 25.

At that point, a switch circuit 30 has been turned on. When the switch circuit 30 is turned on, a switching signal is supplied from a controller CPU (Central Processing Unit) 32 to the switch circuit 25. The switch circuit 25 selects a terminal 25W corresponding to the supplied switching signal. In addition, an address is supplied from the controller CPU 32 to the record medium 24. The controller CPU 32 stores a section address table and has seven address registers shown in FIG. 8B. The controller CPU 32 is composed of a controller having a CPU. The controller CPU 32 controls the selection of the writing operation or the reading operation of the record medium 24.

Figures 8A, 8B, 9:
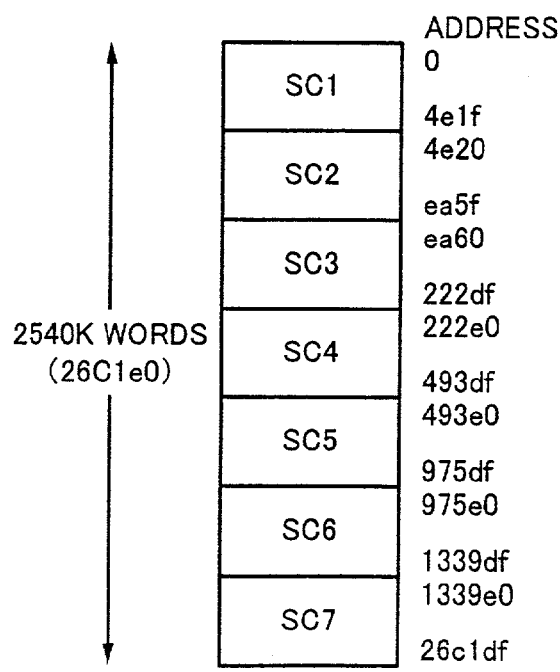
FIGS. 8A and 8B are schematic diagrams for explaining an example of addresses used in the transmitting apparatus according to the present invention.
FIG. 9 is a schematic diagram for explaining an example of addresses used in the transmitting apparatus according to the present invention.

The section address table shown in FIG. 8A stores memory addresses of beginning sections BSC1 to BSC7 and end sections ESC1 to ESC7 of the individual sections. Digital audio data is written to the record medium 24 at a speed of 20 kwords per second. The data amounts necessary for individual sections calculated and addresses of beginning sections and end sections of individual sections converted are as follows.

The address of the beginning section BSC1 of the section 1 is 0H. The address of the end section ESC1 of the section 1 is 4E1FH. The address of the beginning section BSC2 of the section 2 is 4E20H. The address of the end section ESC2 of the section 2 is E4A5FH. The address of the beginning section BSC3 of the section 3 is EA60H. The address of the end section ESC3 of section 3 is 222DFH. The address of the beginning section BSC4 of the section 4 is 222E0H. The address of the end section ESC4 of the section 4 is 493DFH.

The address of the beginning section BSC5 of the section 5 is 493E0H. The address of the end section ESC5 of the section 5 is 975DFH. The address of the beginning section BSC6 of the section 6 is 975E0H. The address of the end section ESC6 of the section 6 is 1339DFH. The address of the beginning section BSC7 of the section 7 is 1339E0H. The address of the end section ESC7 of the section 7 is 26C1DFH. "H" of each address represents hexadecimal notation. In addition, each of the beginning section BSCn and end section ESCn is composed of 22 bits. Thus, the section address table requires a capacity of 22 bits×14.

In other words, when the switch circuit 30 is turned on, digital audio data supplied through the switch circuit 25 is successively stored in the address 0H to the address 26C1DFH of the record medium 24 at a speed of 20 kwords per second as shown in FIG. 9. For digital audio data, the record medium 24 requires the following capacity:

20 kHz×127 seconds=2540 kwords

As was described above, the address range is represented by 22 bits (0H to 26C1DFH). The data width is 16 bits. The record medium 24 may be composed of a semiconductor memory. Alternatively, the record medium 24 may be composed of a HDD (Hard Disk Drive). Moreover, the record medium 24 may be fixedly disposed in the transmitter 4. Furthermore, the record medium 24 may be detachable.

When a switch circuit 31 is turned on, a switching signal is supplied from the controller CPU 32 to the switch circuit 25. The switch circuit 25 selects a terminal 25R corresponding to the supplied switching signal. In addition, an address is supplied from the controller CPU 32 to the record medium 24. At that point, addresses stored in the seven address registers (shown in FIG. 8B) of the controller CPU 32 are supplied to the record medium 24.

In the example, the address of the beginning section BSC1 is stored to the address register ARSC1. The address of the beginning section BSC2 is stored to the address register ARSC2. The address of the beginning section BSC3 is stored to the address register ARSC3. The address of the beginning section BSC4 is stored to the address register ARSC4. The address of the beginning section BSC5 is stored to the address register ARSC5. The address of the beginning section BSC6 is stored to the address register ARSC6. The address of the beginning section BSC7 is stored to the address register ARSC7.

Digital audio data is read from the record medium 24 corresponding to the address supplied from the controller CPU 32. The digital audio data that has been read from the record medium 24 is supplied to a C terminal of a multiplexer 26 through the switch circuit 25. Synchronous data is supplied from the controller CPU 32 to an A terminal of the multiplexer 26. Flag data is supplied from the-controller CPU 32 to a B terminal of the multiplexer 26. A select signal is supplied from the controller CPU 32 to a control terminal of the multiplexer 26.

Figures 10A, 10B, 10C:
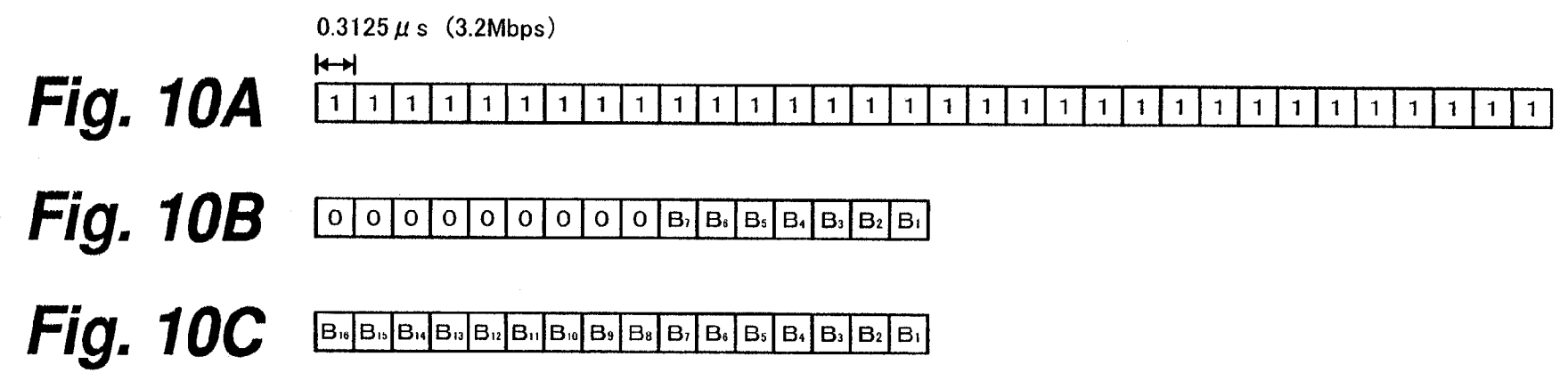

The synchronous data supplied to the A terminal of the multiplexer 26 is composed of 32 bits as shown in FIG. 10A. All 32 bits of the synchronous data are "1s". The flag data supplied to the B terminal of the multiplexer 26 is composed of 16 bits as shown in FIG. 10B. The low order seven bits of the 16 bits form a section start flag. For example, when all the seven sections are beginning data, all low order seven bits of bits $B_1$ to $B_7$ are "1s". In this example, the bit $B_1$ represents the section 1. The bit $B_2$ represents the section 2. The bit $B_3$ represents the section 3. The bit $B_4$ represents the section 4. The bit $B_5$ represents the section 5. The bit $B_6$ represents the section 6. The bit $B_7$ represents the section 7. Thus, when only the section 1 is beginning data, only the bit B1 is "1". As shown in FIG. 10C, the digital audio data supplied to the C terminal of the multiplexer 26 is a PCM signal that is composed of 16 bits and of which FFFFH cannot be used.

The multiplexer 26 re-arranges the synchronous data, the flag data, and the digital audio data in the order as shown in FIG. 11 corresponding to the select signal supplied to the control terminal. In other words, the multiplexer 26 time-division multiplexes a content. The data that has been time-division multiplexed is supplied from the output terminal Y to a shift register 27.

The shift register 27 converts the supplied data as a parallel signal into a serial signal. The data that has been converted into the serial signal is supplied to a modulating circuit 28. The modulating circuit 28 modulates the data of the serial signal so that the signal can be transmitted through the foregoing transmission line 12. The modulated digital signal is supplied to the transmission line 12 through an output terminal 29.

Next, with reference to FIG. 11, the format of a transmission signal supplied to the modulating circuit 28 will be described. One frame is composed of synchronous data (FFFFFFFFH) of 32 bits, flag data of 16 bits, and a section area of 112 bits. The flag data is composed of 0-data of 9 bits and an area of 7 bits. The 7-bit area represents the beginning of each section. The 112-bit section area is composed of section 1 to section 7 for digital audio data. Each of the section 1 to the section 7 is composed of 16 bits. 2000 frames are transmitted as data of a serial signal per second. In other words, one frame is data of a serial signal transmitted in 50 isec. In this case, the transmission rate becomes 3.2 Mbps. As was described above, FFFFH is prohibited in digital audio data so as to distinguish it from a synchronous word. As a result, each frame that is received, digital audio data, and a flag bit can be distinguished.

Figure 12:
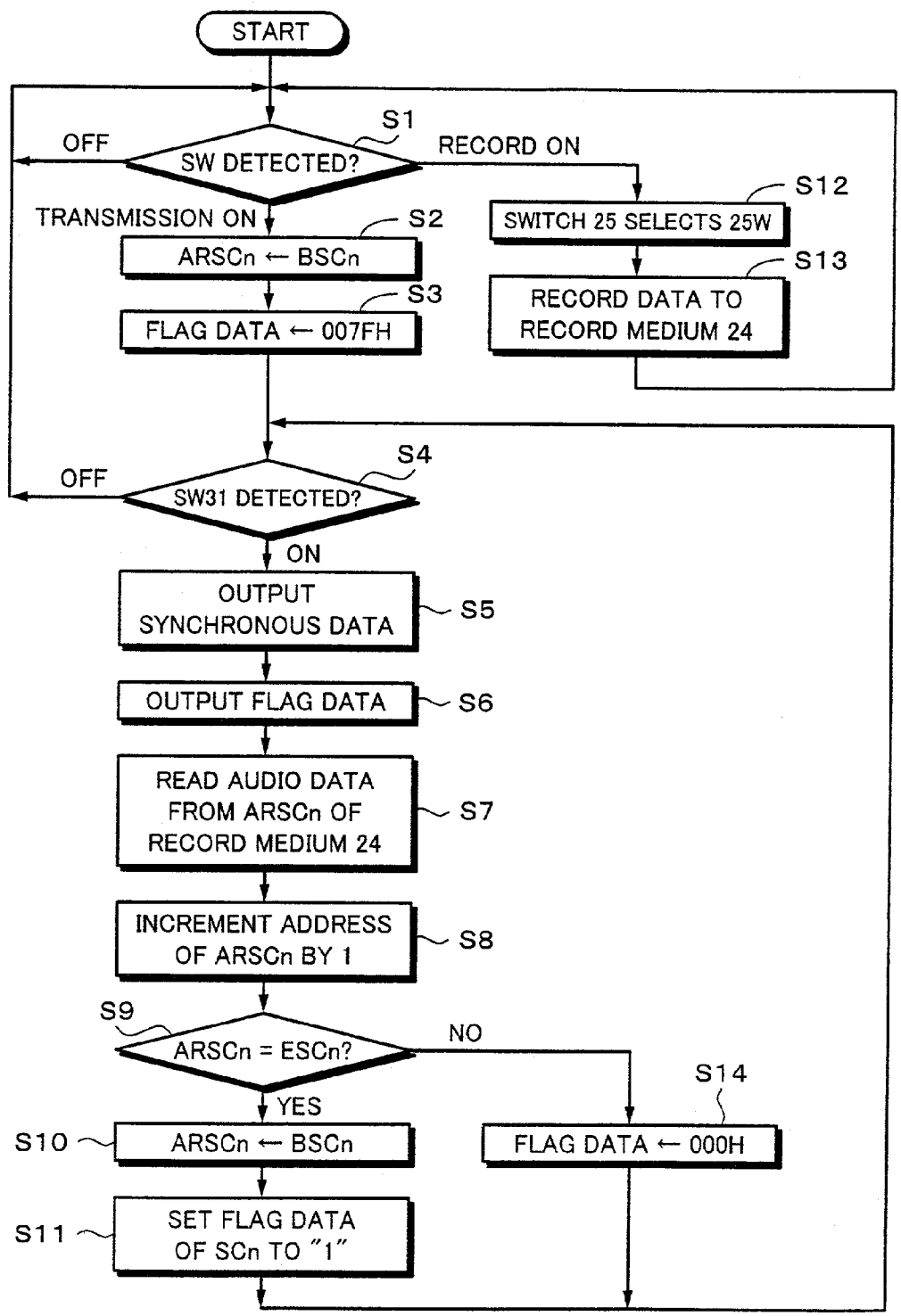
FIG. 12 is a flow chart for explaining an example of a control of the transmitting apparatus according to an embodiment of the present invention.

Next, with reference to a flow chart shown in FIG. 12, the operation of the transmitter 4 will be described. At step S1, the on/off states of the switch circuit 30 and a switch circuit 31 are detected. When the detected result represents that both the switch circuit 30 and switch circuit 31 have been turned off, step S1 is repeated until one of the switch circuit 30 and the switch circuit 31 is turned on. When the detected result represents that the switch circuit 30 has been turned on (namely, the switch for recording audio data to the record medium 24 has been turned on), the flow advances to step S12. When the detected result represents that the switch circuit 31 has been turned on (namely, the switch for transmitting digital audio data written on the record medium 24 from the transmitter 4 has been turned on), the flow advances to step S2.

First of all, the case that the on-state of the switch circuit 30 has been detected will be described. At step S12, the switch circuit 25 selects the terminal 25W corresponding to the switching signal supplied from the controller CPU 32.

At step S13, digital audio data supplied through the switch circuit 25 corresponding to an address supplied from the controller CPU 32 is written to the record medium 24. Thereafter, the control returns to step S1.

Next, the case that the on-state of the switch circuit 31 has been detected will be described. At step S2, an address 0H that represents the beginning section BSC1 is stored in the address register ARSC1 for the section 1. Likewise, addresses that represent the beginning sections BSC2 to BSC7 are stored in the address registers ARSC2 to ARSC7 for the section 2 to the section 7, respectively. Thus, an address 4E20 is stored in the address register ARSC2. An address EA60H is stored in the address register ARSC3. An address 222E0H is stored in the address register ARSC4. An address 493E0H is stored in the address register ARSC5. An address 975E0H is stored in the address register ARSC6. An address 1339E0H is stored in the address register ARSC7.

At step S3, the flag data is set to 007FH.

At step S4, the on/off state of the switch circuit 31 is detected. When the detected result represents that the switch circuit 31 has been turned off, the flow returns to step S1. When the detected result represents that the switch circuit 31 has been turned on, the flow advance to step S5.

At step S5, the synchronous data of FFFFFFFFH is selected and output by the multiplexer 26.

At step S6, when the content is transmitted, since all sections are beginning data, the flag data 007FH is selected and output by the multiplexer 26.

At step S7, digital audio data of the section 1 is read from the address 0H, stored in the address register ARSC1, of the record medium 24. Likewise, digital audio data of the section 2 is read from the address 4E20H, stored in the address register ARSC2, of the record medium 24. Digital audio data of the section 3 is read from the address EA60H, stored in the address register ARSC3, of the record medium 24. Digital audio data of the section 4 is read from the address 222E0H, stored in the address register ARSC4, of the record medium 24. Digital audio data of the section 5 is read from the address 493E0H, stored in the address register ARSC5, of the record medium 24. Digital audio data of the section 6 is read from the address 975E0H, stored in the address register ARSC6, of the record medium 24. Digital audio data of the section 7 is read from the address 1339E0H, stored in the address register ARSC7, of the record medium 24. The digital audio data of the section 1 to section 7 is selected and output by the multiplexer 26.

At step S8, the address 0H stored in the address register ARSC1 is incremented. In other words, the address stored in the address register ARSC1 becomes 1H. Likewise, the address stored in the address register ARSC2 becomes 4E21H. The address stored in the address register ARSC3 becomes EA61H. The address stored in the address register ARSC4 becomes 22E1H. The address stored in the address register ARSC5 becomes 493E1H. The address stored in the address register ARSC6 becomes 975E1H. The address stored in the address register ARSC7 becomes 1339E1H.

At step S9, it is determined whether or not the address stored in the address register ARSC1 matches the address designated to the end section ESC1. In addition, it is determined whether or not the address stored in the address register ARSC2 matches the address designated to the end section ESC2. It is determined whether or not the address stored in the address register ARSC3 matches the address designated to the end section ESC3. It is determined whether or not the address stored in the address register ARSC4 matches the address designated to the end section ESC4. It is determined whether or not the address stored in the address register ARSC5 matches the address designated to the end section ESC5. It is determined whether or not the address stored in the address register ARSC6 matches the address designated to the end section ESC6. It is determined whether or not the address stored in the address register ARSC7 matches the address designated to the end section ESC7.

In other words, at step S9, it is determined whether or not all digital audio data of any of the section 1 to the section 7 has been read from the record medium 24. When the determined result represents that all digital audio data of any of the section 1 to the section 7 has been read from the record medium 24, the flow advances to step S10. In contrast, when the determined result represents that all digital audio data of any of the section 1 to the section 7 has not been read from the record medium 24, the flow advances to step S14.

Next, the case that all digital audio data of any of the section 1 to the section 7 has not been read will be described. At step S14, the flag data is set to 0000H. Thereafter, the flow returns to step S4.

Next, the case that all digital audio data of at least one of the section 1 to the section 7 has been read will be described. At step S10, since the address register for each section that has been read stores the address of the end section, the address of the beginning section is restored to the address register. At step S11, the bit Bn of the flag data corresponding to each section that has been read is set to "1". In other words, since the flag data is used for the next frame, when one of the bits $B_1$ to $B_7$ of the flag data is 1, the beginning data of the section corresponding to the bit $B_n$ that is 1 is placed in the frame.

For example, the flag data is changed in the following order.

007FH→0000H→0001H→0000H→0003H→
0000H→0001H→0000H→0007H→0000H→0001H→
0000H→0003H→0000H→0001H→0000H→000FH→
0000H→0001H→0000H→0003H→0000H→0001H→
0000H→0007H→0000H→0001H→0000H→0003H→
0000H→0001H→0000H→001FH→0000H→0001H→
0000H→0003H→0000H→0001H→0000H→0007H→
0000FH→0001H→0000H→0003H→0000H→0001H→
0000H→000FH→0000H→00001H→0000H→0003H→
0000H→0001H→0000H→0007H→0000H→0001H→
0000H→0003H→0000H→0001H→0000H→003FH→
0000H→0001H→0000H→0003H→0000H→0001H→
0000H→0007H→0000H→0001H→0000H→0003H→
0000H→0001H→0000H→000FH→0000H→0001H→
0000H→0007H→0000H→0001H→0000H→0003H→
0000H→0001H→0000H→000FH→0000H→0001H→
0000H→0003H→0000H→0001H→0000H→0007H→
0000H→0001H→0000H→0003H→0000H→0001H→
0000H→007FH→ . . .

Next, with reference to a block diagram shown in FIG. 13, the internal structure of the receiver 6 will be described. A digital modulation signal transmitted from the transmitter 4 is supplied to an input terminal 41 through the transmission line 12. First of all, a demodulating circuit 42 demodulates the supplied digital modulation signal. In other words, the demodulating circuit 42 demodulates the digital modulation signal to a bit sequence that corresponds to the transmission signal format shown in FIG. 11. The demodulated transmission signal is supplied to a shift register 43 and a PLL (Phase Locked Loop) circuit 47.

The PLL circuit 47 generates a clock signal that synchronizes with the period of the received signal corresponding to the format of the supplied transmission signal. The generated clock signal is supplied as a system clock to each portion of the receiver 6 trough a terminal 48 of the PLL circuit 47.

The shift register 43 re-arranges the supplied transmission signal in parallel. In other words, the shift register 43 converts the digital audio data of the section 1 to the section 7 in the transmission signal format shown in FIG. 11 into 16-bit digital audio data. The converted digital audio data is supplied to an IN terminal of a memory 44. At that point, the synchronous data and the low order seven bits of the flag data obtained from the transmission signal format are supplied to a controller CPU 51.

Figure 14A:
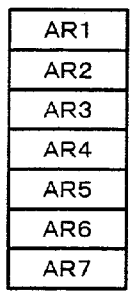
FIGS. 14A, 14B, 14C, 14D, and 14E are schematic diagrams for explaining an example of addresses used in the receiving apparatus according to the present invention.
Figure 14B:
Figure 14C:
Figure 14D:
Figure 14E:
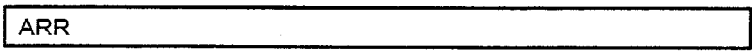

The controller CPU 51 is a controller that has a CPU. The controller CPU 51 controls the reading operation and/or the writing operation of digital audio data from/to the memory 44. The controller CPU 51 is pre-provided with a section address table (that stores beginning sections BSC1 to BSC7 and end sections ESC1 to ESC7) that is similar to the section address table (shown in FIG. 8A) of the controller CPU 32 of the transmitter 4, write address registers AR1 to AR7 shown in FIG. 14A, write enable flags WE1 to WE7 shown in FIG. 14B, a signal break flag FS shown in FIG. 14C, a read enable flag RE shown in FIG. 14D, and a read address register ARR shown in FIG. 14E.

In addition, the controller CPU 51 is provided with switch circuits 49 and 50. The switch circuit 49 is used as a reception start switch. When the switch circuit 49 is turned on, the receiver 6 starts receiving analog audio data. When the switch circuit 49 is turned off, the receiver 6 stops receiving analog audio data. The switch circuit 50 is used to temporary stop outputting a sound from the receiver 6 (namely, the switch circuit 50 is used as a pause switch). When the switch circuit 50 is turned on, a mute signal is supplied from the controller CPU 51 to a D/A converting circuit 46. While the mute signal is being supplied from the controller CPU 51 to the D/A converting circuit 46, it stops outputting analog audio data.

Since the write address register ARn is composed of 22 bits, a capacity of 22 bits×7 is required. Since the write enable flag WEn is composed of one bit, a capacity of 1 bit×7 is required. Each of the signal break flag FS and the read enable flag RE is composed of one bit. The read address register ARR is composed of 22 bits.

When the switch circuit 49 is turned on, a write pulse is supplied from the controller CPU 51 to a WE terminal of the memory 44. The write address ARn is supplied to an $ADD_{IN}$ terminal of the memory 44. A read pulse is supplied to an RE terminal of the memory 44. The read address ARR is supplied to an $ADD_{OUT}$ terminal of the memory 44.

The memory 44 is a two-port buffer memory that allows digital audio data of each section to be reproduced as a successive sound. In other words, the memory 44 can independently or in parallel write and/or read digital audio data. In reality, digital audio data is written from an IN side port of the memory 44 corresponding to the write pulse and the write address supplied from the controller CPU 51. Likewise, digital audio data is read from an OUT side port of the memory 44 corresponding to the read pulse and the read address supplied from the controller CPU 51. The capacity of the memory 44 is 2540 kwords. The data width of the memory 44 is 16 bits. The memory 44 may be composed of a VRAM (Video Random Access Memory). In other words, as long as multiplexed data can be written to the memory 44, the type of the memory 44 is not limited. Digital audio data that is read from the memory 44 is supplied to a shift register 45.

The shift register 45 converts digital audio data that has been read as a parallel signal into a serial signal. The digital audio data that has been converted into the serial signal is supplied from the shift register 45 to the D/A (digital/analog) converting circuit 46.

The D/A converting circuit 46 converts the supplied digital audio data into analog audio data. The converted analog audio data is output as a sound to an earphone, a headset, a speaker, or the like through the terminal 13.

Figure 15A:
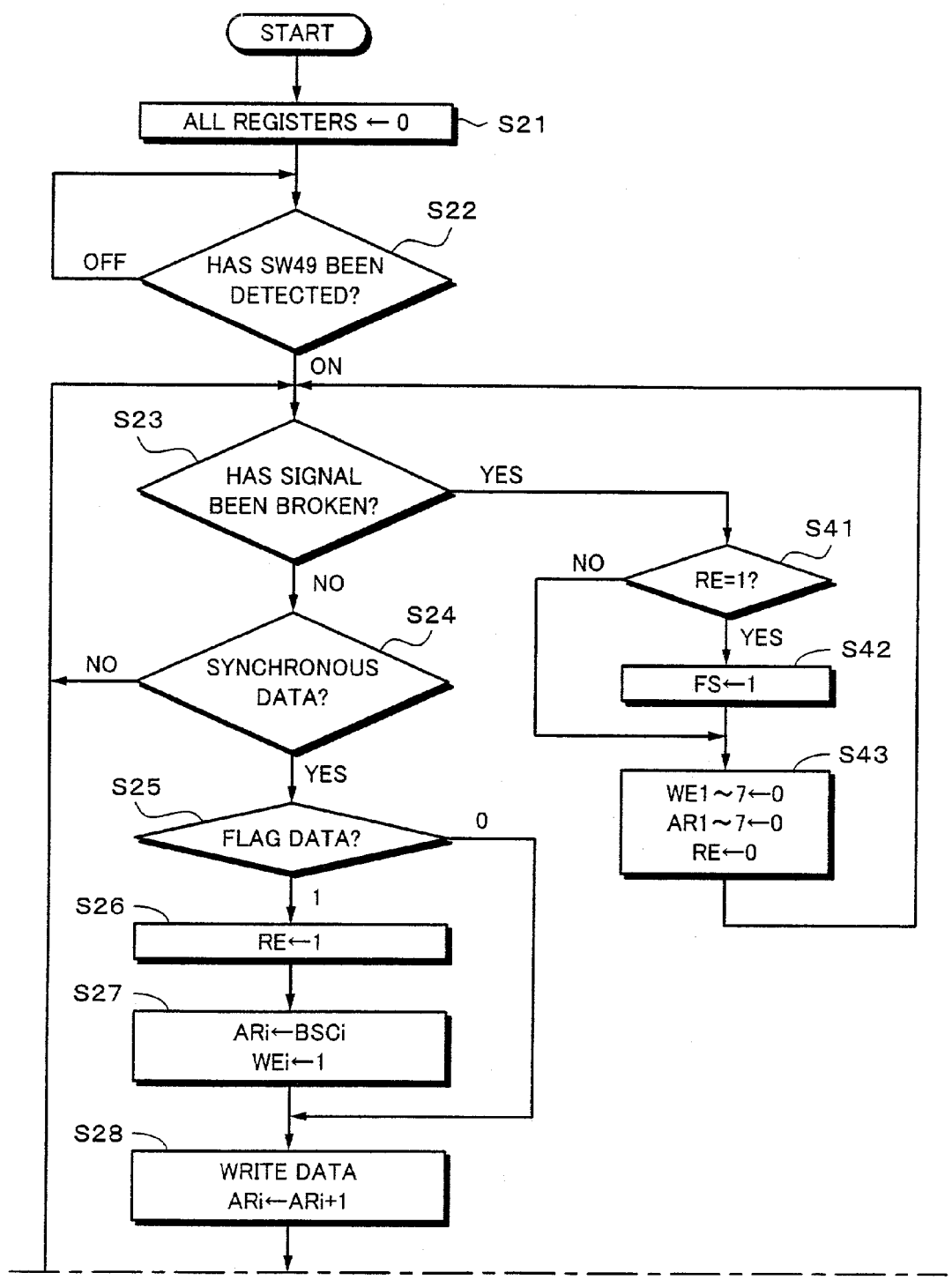
FIG. 15 is a flow chart for explaining an example of a control of the receiving apparatus according to an embodiment of the present invention.
Figure 15B:
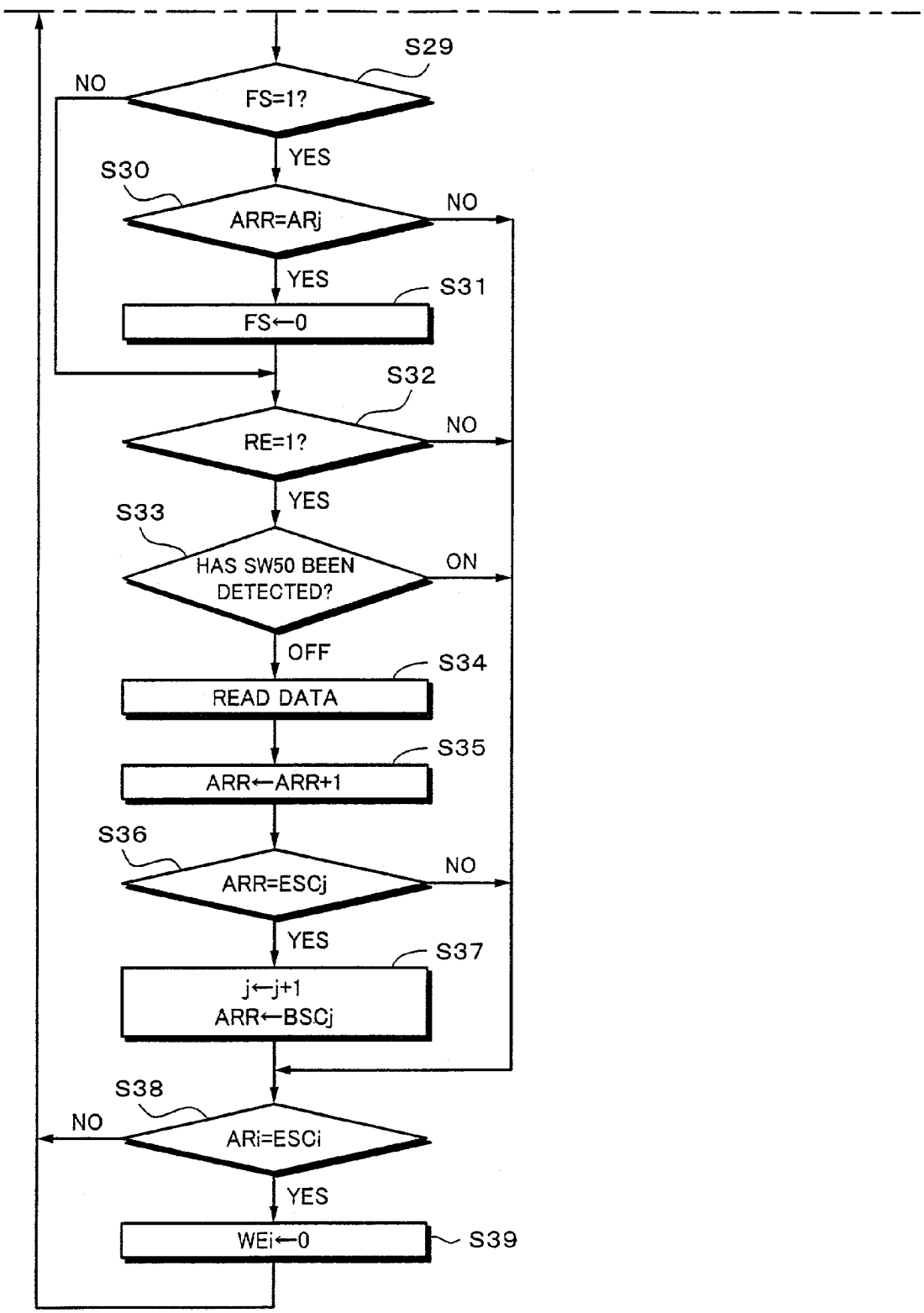

Next, with reference to a flow chart shown in FIG. 15, the control of the receiver 6 will be described. At step S21, all the registers of the controller CPU 51 (namely, the addresses of the write address registers AR1 to AR7 (see FIG. 14A) and the addresses of the read address registers ARR (see FIG. 14E) are set to 0.

At step S22, the state of the switch circuit 49 is detected. When the detected result represents that the switch circuit 49 has been turned on, the flow advances to step S23. At step S23, the receiver 6 starts receiving digital audio data. In contrast, when the detected result represents that the switch circuit 49 has been turned off, step S2 is repeated until the switch circuit 49 is turned on. As was described above, a signal is supplied (received) frame by frame as shown in FIG. 11.

At step S23, it is determined whether or not a frame has been broken in the middle. When the determined result represents that the frame has been broken in the middle, the flow advances to step S41. When the determined result represents that the frame has not been broken in the middle, the flow advances to step S24.

At step S41, it is determined whether or not the read enable flag RE is 1. When the determined result represents that the read enable flag RE is 1, the flow advances to step S42. When the determined result represents that the read enable flag RE is 0, the flow advances to step S43.

At step S42, the signal break flag FS is set to 1.

At step S43, the write enable flags WE1 to WE7, the write address registers AR1 to AR7, and the write enable flag RE are set to 0. Thereafter, the flow advances to step S23.

At step S24, synchronous data is detected from a frame that has been completely received without a break. As shown in FIG. 10A, since the synchronous data is FFFFFFFFH, according to the embodiment, when 1 is received successively 32 times, it is determined that the synchronous data has been detected. When the synchronous data has been detected, the flow advances to step S25. When the synchronous data has not been detected, the flow advances to step S25.

At step S25, flag data is detected from a frame that has been completely received without a break. It is determined whether there is a bit that is 1 in the bits $B_1$ to $B_7$ of the detected flag data. In other words, at step S25, it is determined whether there is beginning data of a section in the frame. When there is no bit that is 1 in the bits $B_1$ to $B_7$, the frame does not have beginning data of a section. Since the flag data is preceded by the synchronous data, it is determined that 16 bits starting with zero preceded by 32 ones are flag data. When there is a bit that is 1 in the bits $B_1$ to $B_7$, the flow advances to step S26. When all the bits $B_1$ to $B_7$ are 0, the flow advances to step S28.

At step S26, the read enable flag RE is set to 1.

At step S27, the beginning section BSCi is stored to the write address register ARi for the section corresponding to a bit that is 1 in the bits $B_1$ to $B_7$ of the flag data. In addition, the write enable flag WEi is set to 1.

When the bit $B_1$ of the flag data is 1, the address 0H of the beginning section BSC1 is stored to the write address register AR1. When the bit $B_2$ of the flag data is 1, the address 4E20H of the beginning section BSC2 is stored to the write address register AR2. When the bit $B_3$ of the flag data is 1, the address EA60H of the beginning section BSC3 is stored to the write address register AR3. When the bit $B_4$ of the flag data is 1, the address 222E0H of the beginning section BSC4 is stored to the write address register AR4. When the bit $B_5$ of the flag data is 1, the address 493E0H of the beginning section BSC5 is stored to the write address register AR5. When the bit $B_6$ of the flag data is 1, the address 975E0H of the beginning section BSC6 is stored to the write address register AR6. When the bit $B_7$ of the flag data is 1, the address 1339E0H of the beginning section BSC7 is stored to the write address register AR7.

At step S28, a section whose write enable flag WEi is 1 is written to the memory 44. After the section has been written, the address stored in the write address register ARi is incremented. For example, the address stored in the write address register AR2 becomes 4E21H. The address stored in the write address register AR3 becomes EA61H. The address stored in the write address register AR4 becomes 222E1H. The address stored in the write address register AR6 becomes 975E1H. The address stored in the write address register AR7 becomes 1339E1H.

At step S29, it is determined whether or not the signal has been broken in the middle (namely, whether or not the signal break flag FS is 1). When the determined result represents that the signal break flag FS is 1, the signal has been broken in the middle. At that point, the flow advances to step S30. When the determined result represents that the signal break flag FS is 0, the flow advances to step S32.

At step S30, it is determined whether or not the address stored in the read address register ARR matches the address stored in the write address register ARj. When the determined result represents that the address stored in the read address register ARR matches the address stored in the write address register ARj, the flow advances to step S31. When the determined result represents that they do not match, the flow advances to step S38.

At step S31, the signal break flag FS is set to 0.

At step S32, it is determined whether or not the read enable flag RE is 1. When the determined result represents that the read enable flag RE is 1, the flow advances to step S33. When the determined result represents that the read enable flag RE is 0, the flow advances to step S38.

At step S33, the state of the switch circuit 50 is detected. When the detected result represents that the switch circuit 50 has been turned on, the flow advances to step S38. At step S38, the receiver 6 stops outputting a sound and enters the pause state. In contrast, when the detected result represents that the switch circuit 50 has been turned off, the flow advances to step S34. When the switch circuit 50 as a pause switch is turned on while digital audio data is being read, the receiver 6 stops reading it. After the switch circuit 50 is turned off, the receiver 6 restarts reading digital audio data from the read stop address.

At step S34, digital audio data is read from the memory 44 and supplied to the shift register 45.

At step S35, the address stored in the read address register ARR is incremented.

At step S36, it is determined whether or not the address stored in the read address register ARR matches the address designated to the end section ESCj of the section that is read. When the address stored in the read address register ARR matches the address designated to the end section ESCj, the flow advances to step S37. When they do not match, the flow advances to step S38.

At step S37, the value of j is incremented corresponding to the sequence of the digital audio data that has been read so as to read the next section. The address for the beginning section BSCj of the next section is stored to the read address register ARR. In other words, when the section 1 has been read, the address 4E20H of the beginning section BSC2 of the section 2 is stored to the read address register ARR. In such a manner, digital audio data is successively read from the addresses 0H to 26C1DFH. When the read address becomes 26C1DFH, the receiver 6 stops reading digital audio data.

At step S38, it is determined whether or not the address stored in the write address register ARi matches the address designated to the end section ESCi of the relevant section. In other words, it is determined whether or not the relevant section has been completely written. When the address stored in the write address register ARi matches the address designated to the end section ESCi, the flow advances to step S39. When they do not match, the flow advances to step S23.

At step S39, the write enable flag WEi of the section that has been written is set to 0. Thereafter, the flow advances to step S22.

Thus, according to the flow chart, a bit sequence obtained from the demodulating circuit 42 is converted into a parallel signal by the shift register 43. Synchronous data and flag data are supplied to the controller CPU 51. The controller CPU 51 monitors the synchronous data and the flag data. When the bits $B_1$ to $B_7$ of the flag data become 1, the corresponding section is written to the memory 44. After the section has been completely written, the writing operation thereof is stopped.

In addition, according to the embodiment, while digital audio data is being written to the memory 44, digital audio data is read therefrom. The digital audio data that has been read is supplied to the shift register 45. The shift register 45 converts the digital audio data into a serial signal. The D/A converting circuit 46 converts the serial signal into an analog signal. As a result, the D/A converting circuit 46 outputs the analog signal as an analog audio signal.

Next, with reference to FIG. 16, an example of a process performed in the case that before all sections have been completely written, the transmission line 12 is unexpectedly broken will be described. FIG. 16 shows an example of which the transmission line 12 is broken while the section 4 is being reproduced at time t1. It is assumed that at time t1, digital audio data is read from the memory 44 and that while the digital audio data being reproduced, the transmission line 12 is broken. At time t2, the writing operation and the reproducing operation for digital audio data are stopped. The reading operation of the memory 44 is immediately stopped. The addresses stored in the read address registers for all the sections and the addresses stored in the write address registers AR1 to AR7 for all the sections are kept.

At time t3, the transmission line 12 is recovered to the normal state. The receiver 6 sops the writing operation until the beginning data of the section that has not been completely read is received. In the example, the receiver 6 stops the writing operation until the beginning data of the section 4 is received. At time t4, the receiver 6 receives the beginning data of the section 4 and the section 5 and re-starts the writing operation for the section 4 and the section 5. At time t5, since the address stored in the write address register AR4 becomes the address for the section 4 for which the transmission line 12 has been broken, the receiver 6 re-starts reading digital audio data from the memory 44 and reproducing the digital audio data. At time t6, the receiver 6 restores the writing operation for the section 6. At time t7, the receiver 6 restores the writing operation for the section 7.

In such a manner, the receiver 6 restores the reproducing operation from the position at which it was stopped because of the break of the transmission line 12. Thereafter, the receiver 6 securely reproduce the rest of the content.

Figure 17:
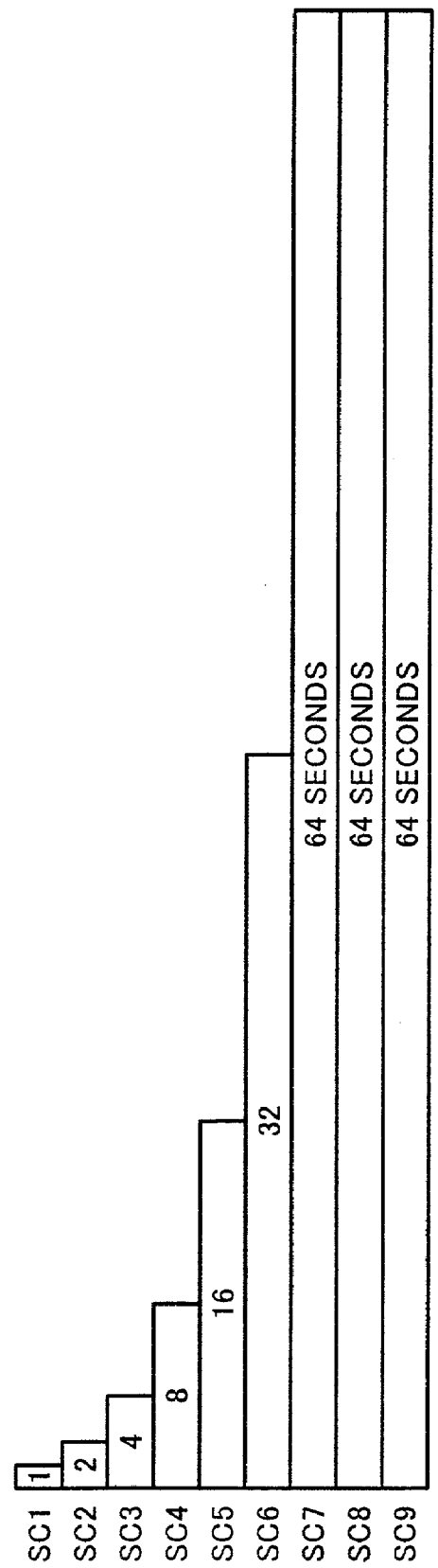
FIG. 17 is a schematic diagram for explaining another example of a signal format according to the present invention.

Next, with reference to FIG. 17, a signal format according to another embodiment will be described. In the signal format of the foregoing embodiment, a content of 127 seconds is divided into sections 1 to 7 with a maximum waiting time of one second. As a result, the length of the last section (namely, the section 7) is 64 seconds. When the length of a content is larger than 127 seconds, a section of 128 seconds as section 8, a section of 256 seconds as section 9, . . . may be provided. However, as shown in FIG. 17, like the section 7, the sections preceded by the section 7 may have a fixed length of 64 seconds. In other words, using nine channels, on the channel 8, the section 8 of 64 seconds is transmitted; and on the channel 9, the section 9 of 64 seconds is transmitted. At that point, the length L of the content becomes 255 seconds. Thus, even if the signal format is changed, the transmitter 4 and the receiver 6 can be used without need to change the basic operations thereof.

Next, with reference to FIG. 18, an example of the case that a semiconductor memory is used as the foregoing record medium 24 will be described. In other words, as the record medium 24, a detachable semiconductor memory 61 can be used. The semiconductor memory 61 is attached to a recorder 62. Digital audio data is recorded to and/or reproduced from the semiconductor memory 61 attached to the recorder 62. For example, an earphone 63 is disposed in the recorder 62. For example, the semiconductor memory 61 in which digital audio data has been recorded in the standard format is attached to the transmitter 4'. The transmitter 4' executes only a reading process for digital audio data from the semiconductor memory 61 attached to the transmitter 4' and transmits the digital audio data to receivers $6_1$, $6_2$, $6_3$, . . . through the transmission line 12. The receivers $6_1$, $6_2$, $6_3$, . . . are provided with earphones $64_1$, $64_2$, $64_3$, . . . , respectively. In such a manner, a semiconductor memory formatted for an individual user can be used as a source for a system for many people without need to perform any process for the recorded digital audio data.

Next, with reference to FIGS. 19A, 19B, 19C, and 19D, an example of the case that a HDD (Hard Disk Drive) is used as the foregoing record medium 24 will be described. A HDD can be used as the record medium 24. Although the capacity of an HDD is larger than that of the semiconductor memory 61, the random access speed of the former is much lower than that of the latter because the former requires a seeking operation of a head. Thus, when an HDD is used, such points should be considered.

Figures 19A, 19B:
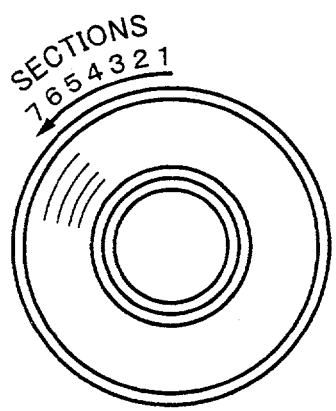
FIGS. 19A, 19B, 19C, and 19D are schematic diagrams for explaining an example of which a HDD is used as a record medium of the transmitting apparatus according to the present invention.

Data in the signal format shown in FIG. 6 or data in the transmission signal format shown in FIG. 11 is pre-recorded to a HDD. As shown in FIG. 19A, data is written to section 1 to section 6 corresponding to the length of section 7 (of 64 seconds) that has the largest length in those sections. In other words, data is written so that the length of each of the section 1 to the section 7 becomes 64 seconds.

In reality, since the length of the section 1 is one second, the section 1 is written to the HDD 64 times. Since the length of the section 2 is two seconds, the section 2 is written to the HDD 32 times. Since the length of the section 3 is four seconds, the section 3 is written to the HDD 16 times. Since the length of the section 4 is eight seconds, the section 4 is written to the HDD eight times. Since the length of the section 5 is 16 seconds, the section 5 is written to the HDD four times. Since the length of section 6 is 32 seconds, two section 6 is written to the HDD two times. Since the length of the section 7 is 64 seconds, the section 7 is written to the HDD one time. As shown in FIG. 19B, the section 1 to the section 7 are written to the HDD along a track thereof.

In such a manner, data is written to the HDD. Thus, data is successively read from the HDD. As a result, by moving the head to adjacent tracks, data can be read. Consequently, as a weak point of the HDD, the seek time can be decreased. However, since the data amount of the HDD becomes redundant, when the length of a content is 127 seconds, the HDD requires the data amount about 3.53 times larger than the original data amount (namely, data of (64 seconds×7 sections=448 seconds) is required against data of 127 seconds).

Figure 19C:
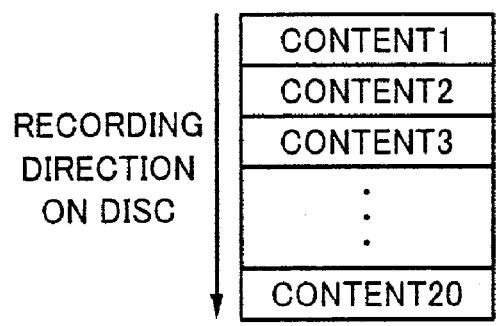

Next, as shown in FIG. 19C, the capacity necessary for writing 20 127-second contents to a HDD is calculated.

64 seconds×7×20 contents=8960 seconds 8960 seconds×20 kHz=179.2 Mwords 179.2 Mwords×16 bits/8 bits=358.4 Mbytes In other words, a capacity of at least 358.4 Mbytes is required.

At that point, the reading speed can be expressed as follows:

3.2 Mbps×20 contents=57.6 Mbps

Thus, the maximum waiting time of each of 20 contents becomes one second.

Figure 19D:
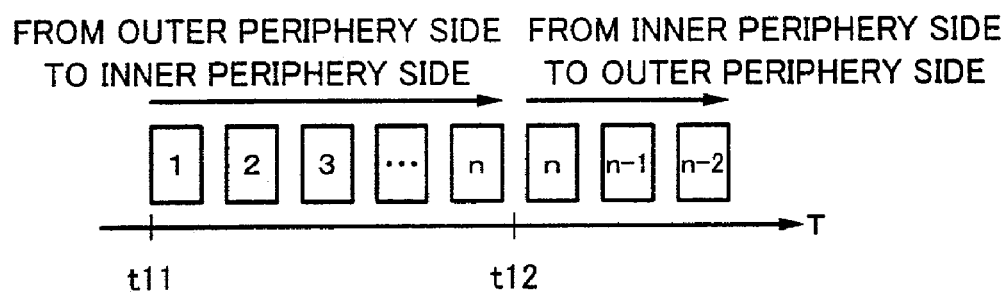

To prevent the seek time required after the head reaches the end of a predetermined data area until the head returns to the beginning of another data area, a record format of which only the record surface is changed can be effectively used. For example, as shown in FIG. 19D, at time t11, sector 1, sector 2, sector 3, . . . , sector n of side A are read. At time t12, after the sector n has been read, sector n, sector n−1, sector n−2, . . . , of side B are read. In other words, data is recorded in such a manner that at time t11, sectors are successively read from the outer periphery side to the inner periphery side and that at t12 (namely, all sectors have been read from side A) sectors are successively read from the inner periphery side to the outer periphery side.

Figure 20:
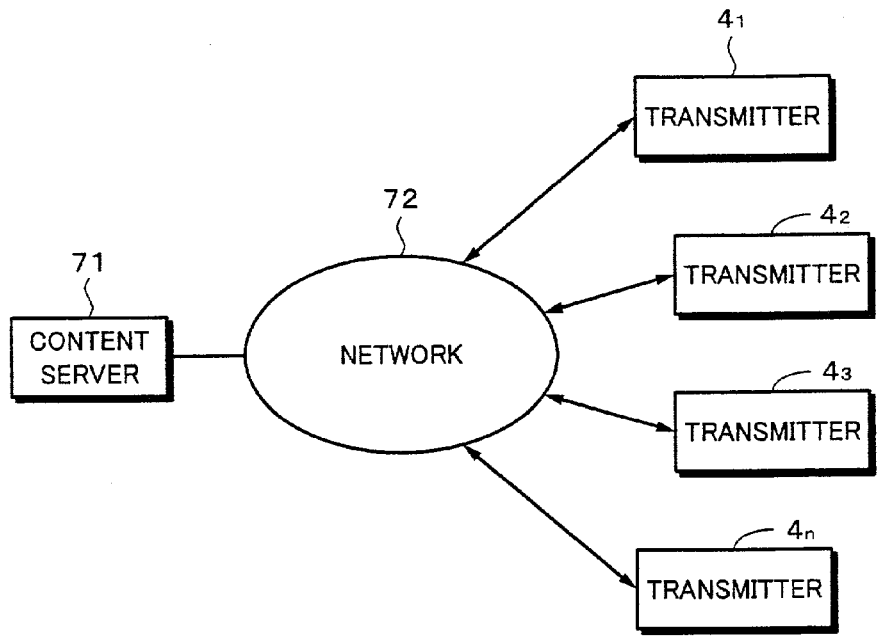
FIG. 20 is a schematic diagram for explaining an example of which a network is used as a transmission line of a transmitting and receiving system according to the present invention.

Next, with reference to FIG. 20, an example of the case that a network is used as the transmission line 12 will be described. A plurality of contents are stored in a content server 71. In addition, a communication interface (not shown) is disposed in the content server 71. The communication interface is composed of a router that can be connected to a network 72. The content server 71 is for example Internet. Transmitters $4_1$, $4_2$, $4_3$, . . . , $4_n$ (hereinafter generally referred to as transmitter 4) each have a communication function. The transmitter 4 can be connected to the network 72.

In the example, when the transmitter 4 requests a desired content, the requested content is supplied from the content server 71 to the transmitter 4 through the network 72. The supplied content is written to a record medium 24 disposed in the transmitter 4.

A content that is stored in the content server 71 may not be divided. Alternatively, a content that is stored in the content server 71 may be in the signal format of which the content is divided into sections shown in FIG. 6. Alternatively, a content that is stored in the content server 71 may be in the transmission signal format shown in FIG. 11.

The transmitter 4 may be connected to the network 72 through a telephone line. Alternatively, the transmitter 4 may be connected to the network 72 through a CATV (Cable Television) network service or a cellular phone network. Of course, a dedicated line or a satellite line may be used. Alternatively, the content server 71 may be directly connected to the transmitter 4. At that point, a telephone line may be used. Alternatively, a CATV (Cable Television) network service or a cellular phone network service may be used. Of course, a dedicated line or a satellite line may be used. In other words, as long as a desired content can be transmitted through the transmission line, the present invention does not limit the type of the transmission line regardless of which it is wired or wireless.

Thus, contents can be dynamically changed. In addition, contents of many transmitters 4 can be totally managed.

When video data rather than audio data is transmitted, the video data is encoded corresponding to MPEG (Moving Picture Experts Group) standard or G*** standard, not converted into a PCM signal. For example, video data of which a content of two hours has been encoded corresponding to MPEG2 (Moving Picture Experts Group phase 2) standard at 6 Mbps is transmitted using seven sections. In this example, it is assumed that the maximum waiting time is 56 seconds and the reading speed of video data from an HDD is 42 Mbps. To record the video data, a capacity of at least 5.4 Gbytes×3.53=around 19 Gbytes is required for the HDD.

When a content of 120 seconds is transmitted using eight sections, the maximum waiting time is normally around 15 seconds. However, according to the embodiment of the present invention, the maximum waiting time can be described to around 0.5 seconds. In other words, according to the embodiment of the present invention, the maximum waiting time can be decreased to 1/30 times lower than the conventional method. When video data of two hours is encoded corresponding to the MPEG2 standard at 6 Mbps and the maximum waiting time is designated to 0.88 seconds, according to the conventional method, 8192 sections are required. In contrast, according to the embodiment of the present invention, only 13 sections (78 Mbps) are required. In other words, the capacity of the transmission line can be reduced to 1/630 of the conventional method.

When audio data is encoded corresponding to G729 standard, 53 127-second contents are encoded at 8 kbps. In this example, each content is transmitted using seven sections. In this case, the maximum waiting time for each content is one second and the record medium requires a capacity of 6.7 Mbytes. The transmission rate from the transmitter 4 to the receiver 6 is 3 Mbps. Thus, as a transmission means, infrared ray can be used.

In the example, a request for a desired content is transmitted from the transmitter 4 to the content server 71. Alternatively, whenever a content stored in the content server 71 is updated to a new content, it may be transmitted from the content server 71 to the transmitter 4.

Figure 21:
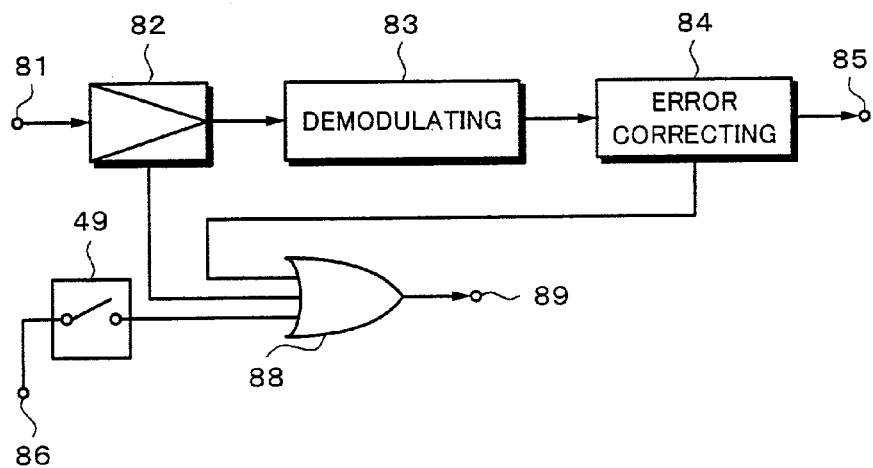
FIG. 21 is a block diagram for explaining an example of which infrared ray is used as a transmission line of the transmitting and receiving system according to the present invention.

Next, with reference to FIG. 21, an example of the case that infrared ray is used as the transmission line 12 will be described. A digital modulation signal as infrared ray is transmitted from the transmitter 4 through the transmission line 12 and supplied to an input terminal 81. The digital modulation signal is supplied from the input terminal 81 to an amplifying circuit 82. In the amplifying circuit 82, when the amplified digital modulation signal exceeds a predetermined level, a high level signal is supplied to a first input terminal of an OR gate 88. When the level of the signal does not exceed a predetermined level, a low level signal is supplied to the first input terminal of the OR gate 88. The amplified digital modulation signal is supplied to a demodulating circuit 83.

The demodulating circuit 83 demodulates the supplied digital modulation signal. In other words, the demodulating circuit 83 demodulates the digital modulation signal to a bit sequence of the transmission signal format shown in FIG. 11. The demodulated bit sequence of the transmission signal format is supplied to an error correcting circuit 84.

The error correcting circuit 84 corrects an error of the supplied signal of the transmission signal format. At that point, the error correcting circuit 84 obtains an error ratio of the signal. When the obtained error ratio is equal to or lower than a predetermined value, a high level signal is supplied to a second input terminal of the OR gate 88. When the error ratio exceeds the predetermined value, a low level signal is supplied to the second input terminal of the OR gate 88. The signal that has been error corrected is supplied to a shift register 43 and a PLL circuit 47 through an output terminal 85.

A high level signal or a low level signal is supplied to a third input terminal of the OR gate 88 depending on whether the switch circuit 49 is turned on or off, respectively. For example, a high level signal is supplied to a terminal 86 connected to the switch circuit 49. Thus, when the switch circuit 49 is turned on, the high levels signal is supplied to the third input terminal of the OR gate 88. When the switch circuit 49 is turned off, the low level signal is supplied to the third input terminal of the OR gate 88. When the signal level of at least one of the signal supplied from the amplifying circuit 82 to the input terminal of the OR gate 88, the signal supplied from the error correcting circuit 84, and the signal supplied from the switch circuit 49 becomes high, the high level signal is output from the output terminal of the OR gate 88 through an output terminal 89. When the high level signal is output from the output terminal 89, the receiving process for the foregoing digital audio data is controlled.

When infrared ray is used for the transmission line 12, the switch circuit 49 used as a reception start switch can be turned on or off depending on whether or not the reception signal is present, respectively. For example, when the intensity of the reception signal becomes equal to or higher than a predetermined value or the reception error ratio is equal to or lower than a predetermined value, a control equivalent to the operation for turning on the switch circuit 49 can be performed.

Thus, when a user who has the receiver 6 enters a range in which the transmitter 4 radiates infrared ray, the receiver 6 can automatically reproduce data transmitted from the transmitter 4.

In addition, when the user causes the receiver 6 to be oriented to a desired transmitter 4 in a room in which a plurality of transmitters 4 are disposed, the receiver 6 can automatically reproduce data transmitted from the desired transmitter 4.

Next, with reference to FIGS. 22A and 22B, another example of the memory 44 will be described. It is assumed that section 1 is referred to as higher section and sections that follow the section 1 are referred to as lower sections. In other words, the section 1 to the section 3 are higher sections of section 4. Section 5 to section 8 are lower sections of the section 4. Thus, the highest section is the section 1, whereas the lowest section is the section 8.

A content is reproduced successively from the section 1 to the lower sections. When a lower section is being read, a higher section has been read. Thus, even if data that is going to be read is written to an area in which a higher section was written, there is no problem. Thus, data of a lower section can be written to an area in which data of a higher section that had been read was written (hereinafter, such an area is referred to as used area). Thus, when data of lower sections is successively overwritten on a used area, the writing/reading operations can be controlled as a so-called ring buffer. With such a ring buffer, the capacity of the memory 44 can be minimized. In other words, in the foregoing example, the capacity of the memory 44 corresponds to the total length of a content. However, when the memory 44 is composed of a ring buffer, the capacity of the memory 44 becomes equal to or smaller than the total length of a content.

Figure 22A:
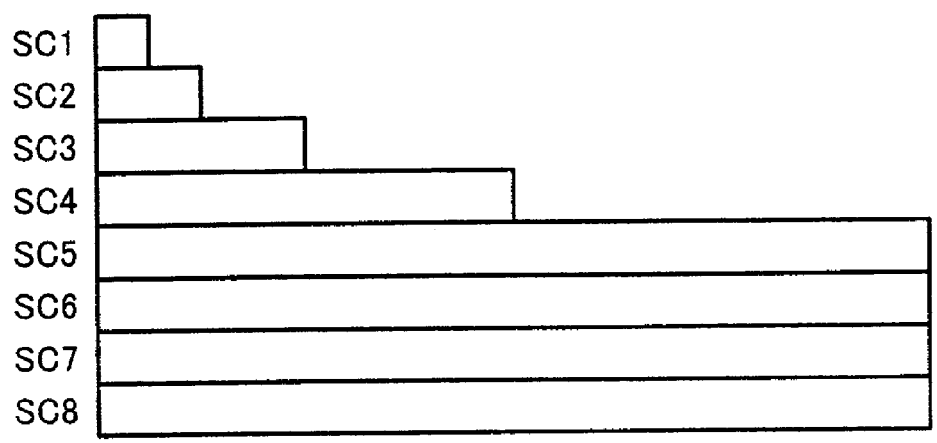
FIGS. 22A and 22B are schematic diagrams for explaining an example of a control of a memory of the receiving apparatus according to the present invention.

FIG. 22A shows an example of each section written in the ring buffer. The structure of sections shown in FIG. 22A is the same as that of the signal format according to the embodiment shown in FIG. 17. The signal format shown in FIG. 22A is composed of eight sections. The length of each of the section 1 to the section 5 is twice as large as the just preceding higher section. The length of each of the section 6 to the section 8 is the same as the length of the section 5. When the signal is written or read in the signal format with the ring buffer, a memory having a total of a capacity for the section 1 and a capacity the section 1 to the section 4 is required. In other words, a capacity for the section 5 to the section 8 is not required.

Each of the section 5 to the section 8 whose length is the same as the length of the lowest section is referred to as standard section. Each of the section 1 to the section 4 whose length is twice the length of the just preceding higher section except for the standard sections is referred to as acceleration section. In this case, the capacity of the memory 44 can be minimized as follows:

Acceleration section+highest section (section 1)

Figure 22B:
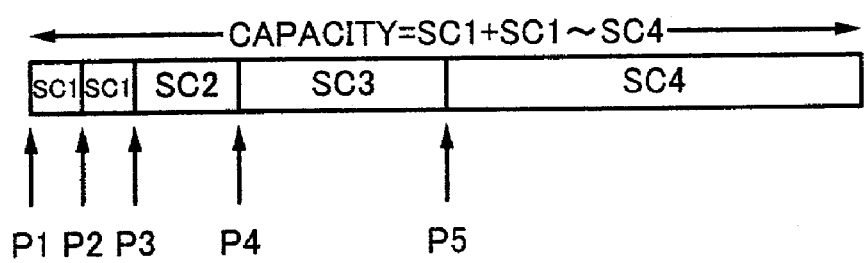

At that point, as shown in FIG. 22B, the address designated to the beginning section BSC1 of the section 1 becomes position P2. The address designated to the beginning section BSC2 of the section 2 becomes position P3. The address designated to the beginning section BSC3 of the section 3 becomes position P4. The address designated to the beginning section BSC4 of the section 4 becomes position P5. The address designated to the beginning section BSC5 of the section 5 becomes position P1. The address designated to the beginning section BSC6 of the section 6 becomes position P1. The address designated to the beginning section BSC7 of the section 7 becomes position P1. The address designated to the beginning section BSC8 of the section 8 becomes position P1. At that point, the section 5 to the section 8 written from the position P1 of the memory 44 should be written after the higher sections have been written. In other words, after the section 5 has been written, the section 6 is written. After the section 6 has been written, the section 7 is written. After the section 7 has been written, the section 8 is written.

Each of the section 1 to the section 5 is received from beginning data thereof and written from the address designated to the beginning section BSCn of the section whose beginning data is received. The sections are read from the memory 44 starting with the beginning section BS1 of the section 1.

Figure 23A:
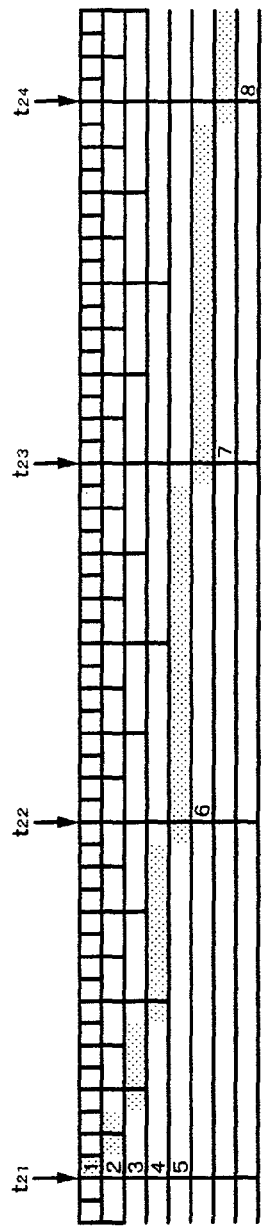
FIGS. 23A, 23B, and 23C are schematic diagrams for explaining examples of a control of a memory of the receiving apparatus according to the present invention.
Figure 23B:
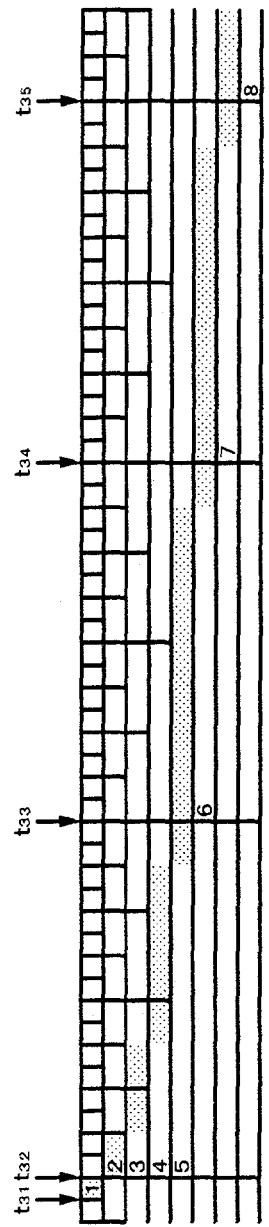
Figure 23C:
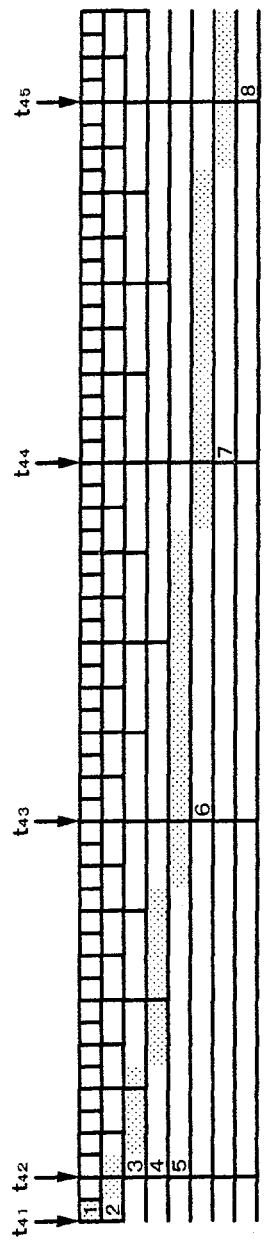

FIGS. 23A, 23B, and 23C are timing charts showing the case that digital audio data is read from the memory 44 that is composed of a ring buffer. In FIGS. 23A, 23B, and 23C, hatched areas represent that sections are read from the memory 44 and reproduced.

In the timing chart shown in FIG. 23A, section 1 to section 5 are written to the memory 44 at time t21. The section 1 is written to the memory 44. In addition, the section 1 is read from the memory 44 and reproduced. After the section 1 has been read, the section 2 that has been written at time t21 is read from the memory 44. Thereafter, the section 3the section 5 that have been written to the memory 44 at time t21 are successively read from the memory 44. The section 5 is read from the memory 44 before time t22. Thus, since the section 5 has been read from the memory 44 at time t2, section 6 is written to the memory 44 at time t22. Likewise, the section 6 that had been written to the memory 44 at time t22 has been read at time t23, section 7 is written to the memory 44 at time t23. Since the section 7 that had been written to the memory 44 at time t23 has been read at time t24, section 8 is written to the memory 44 at time t24.

In the timing chart shown in FIG. 23B, section 1 is written to the memory 44 at time t31. In addition, the section 1 is read from the memory 44 and reproduced at time t31. At time t32, the section 1 has been read. At time t32, section 2 to section 5 are written to the memory 44. At that point, the section 2 is written to the memory 44. In addition, the section 2 is read from the memory 44 and reproduced. The section 3 to the section 5 that have been written to the memory 44 at time t32 are successively read from the memory 44. The section 5 is read from the memory 44 before time t33. Thus, since the section 5 has been read from the memory 44 at time t33, section 6 is written to the memory 44 at time t33. Likewise, since the section 6 that had been written to the memory 44 at time t33 has been read at time t34, section 7 is written to the memory 44 at time t34. Since the section 7 that had been written to the memory 44 at time t34 has been read at time t35, section 8 is written to the memory 44 at time t35.

In the timing chart shown in FIG. 23C, section 1 and section 2 are written to the memory 44 at time t41. The section 1 is written to the memory 44. In addition, the section 1 is read from the memory 44 and reproduced. When the section 1 is read from the memory 44, the section 2 that has been written to the memory 44 at time t41 is read. While the section 2 is being read from the memory 44 at time t42, section 3 to section 5 are written to the memory 44. After the section 2 has been read, the section 3 to the section 5 that have been written to the memory 44 at time t42 are successively read from the memory 44. The section 5 is read from the memory 44 before time t43. Thus, since the section 5 has been read from the memory 44 at time t43, section 6 is written to the memory 44 at time t43. Likewise, since the section 6 that had been written to the memory 44 at time t43 has been read at time t44, section 7 is written to the memory 44 at time t44. Since the section 7 that had been written to the memory 44 at time t44 has been read at time t45, section 8 is written to the memory 44 at time t45.

According to the foregoing embodiment, the transmitter and the receiver are structured by hardware. Alternatively, the foregoing operations can be controlled by a program. For example, such a program is recorded on a record medium such as a CD-ROM (Compact Disc-Read Only Memory) and supplied to a personal computer. In the personal computer, required program data is read from the CD-ROM. The program data that has been read from the CD-ROM is recorded to a predetermined record medium such as a HDD (Hard Disk Drive) disposed in the personal computer. The program data is read to a memory or the like and interpreted and executed by a CPU (Central Processing Unit).

The method for supplying the program is not limited to the foregoing method (namely, through the foregoing record medium). Alternatively, the program may be supplied to the personal computer through the transmission line 12. In addition, the program may be supplied to the personal computer through the Internet as the transmission line.

According to the embodiment, in the transmission signal format, a signal has been time-division multiplexed. Alternatively, a signal may be frequency multiplexed. In other words, as long as data of section 1 to section n can be transmitted at a time, any format can be used.

According to the foregoing embodiment, one transmitter 4 is disposed in the exhibition room 1. Alternatively, a plurality of transmitters $4_1, 4_2, \ldots, 4_p$ may be disposed in the exhibition room 1.

According to the present invention, when the total length of a content matches the capacity of a transmission line, the maximum waiting time for the content can be decreased. When the total length of a content matches the maximum waiting time thereof, the capacity of a transmission line can be decreased. When the maximum waiting time of a content matches the capacity of a transmission line, the total length of the content can be increased. In other words, when the total length of a content is denoted by L, the number of channels (capacity of a transmission line) is denoted by K ch, and the maximum waiting time of the content is denoted by λ, the following formula is obtained.

$$L = \lambda \times (2^K - 1)$$

According to the present invention, even if a wireless transmission line using infrared ray whose capacity is relatively small is used, a content whose length is sufficiently large can be reproduced with a very short maximum waiting time.

According to the present invention, since the total length of a content becomes sufficient, a verity of features such as multiple languages and hierarchy can be used for contents.

According to the present invention, even if the capacity of a content is large (for example, a content of a movie) and a device whose access time is long such as an HDD is used as a content storing medium, as long as a means for allowing data to be output without a delay is provided, video data can be transmitted within a practical waiting time. Thus, a video server system using a one-way transmitter and an unlimited number of receivers can be accomplished.

Although the present invention has been shown and described with respect to a best mode embodiment thereof, it should be understood by those skilled in the art that the foregoing and various other changes, omissions, and additions in the form and detail thereof may be made therein without departing from the spirit and scope of the present invention.

What is claimed is:

1. A transmitting apparatus for transmitting a content program, comprising:
   a record medium on which at least one content program has been written is stored;
   section generating means for generating a section generator that divides the content program into sections, section 1 to section n (where n is an integer) in such a manner that when the content program is divided into the section 1 to the section n in a predetermined ratio, the length of a section on the beginning side is smaller than the length of a section on the end side section n is longer than the length of section 1;
   signal formatting means for formatting a signal formatter that formats a signal in such a manner that the length of data of each of the section 1 to the section n in the content program is the same in each of channel 1 to channel n;
   multiplexing means for multiplexing a multiplexer to multiplex the signal formatted by the signal formatter; and
   transmitting means for transmitting a transmitter to transmit the multiplexed signal,
   wherein said section generating means generator divides the content program so that a ratio of the lengths of the section 1 to the section m (where 1<m<n: m is an integer) become is $1, 2, 4, \ldots, 2^{(m-1)}$, respectively, and that wherein the length of each of the section m to the section n is the same as the length of the section m.

2. The transmitting apparatus as set forth in claim 1, wherein said signal formatting means formatter repeats data of each of the section 1 to the section m−1 so that the length of each of signals of the channel 1 to the channel m−1 (where 1<m<n; m is an integer) is the same as the length of a signal of the channel m and that the length of each of the signals of the channel m to the channel n is the same as the length of the signal of the channel m.

3. The transmitting apparatus as set forth in claim 1, wherein said multiplexing means multiplexer multiplexes synchronous data, flag data, and the data of the section 1 to the section n, the synchronous data being used to establish a synchronization with a receiver, the flag data representing that beginning data is contained in each of the section 1 to the section n.

4. The transmitting apparatus as set forth in claim 1, wherein the multiplexed signal is modulated.

5. A transmitting method for transmitting a content program, the method comprising the steps of:
   writing at least one content program to a record medium;
   generating dividing the content program into sections, section 1 to section n (where n is an integer) in such a manner that when the content program is divided into the section 1 to the section n in a predetermined ratio, the length of a section on the beginning side is smaller than the length of a section on the end side section n is longer than the length of section 1;
   formatting a signal in such a manner that the length of data of each of the section 1 to the section n in the content program is the same in each of channel 1 to channel n;
   multiplexing the formatted signal; and
   transmitting the multiplexed signal,
   wherein the content program is divided so that a ratio of the lengths of the section 1 to the section m (where 1<m<n; m is an integer) become is $1, 2, 4, \ldots, 2^{(m-1)}$, respectively, and that wherein the length of each of the section m to the section n is the same as the length of the section m.

6. The transmitting method as set forth in claim 5, wherein data of each of the section 1 to the section m−1 is repeated so that the length of each of signals of the channel 1 to the channel m−1 (where 1<m<n; m is an integer) is the same as the length of a signal of the channel m and that the length of each of the signals of the channel m to the channel n is the same as the length of the signal of the channel m.

7. The transmitting method as set forth in claim 5, wherein synchronous data, flag data, and the data of the section 1 to the section n are multiplexed, the synchronous data being used to establish a synchronization, the flag data representing that beginning data is contained in each of the section 1 to the section n.

8. The transmitting method as set forth in claim 5, wherein the multiplexed signal is modulated.

9. A receiving apparatus for receiving a signal from a transmitting apparatus and reproducing the received signal, the transmitting apparatus having a first record medium on which at least one content program has been written, a section generating means for generating generator that divides the content program into sections, section 1 to section n (where n is an integer) in such a manner that when the content program is divided into the section 1 to the section n in a predetennined ratio, the length of a section on the beginning side is smaller than the length of a section on the end side section n is longer than the length of section 1, a signal formatting means for formatting formatter that formats a signal in such a manner that the length of data of each of the section 1 to the section n is the same in each of channel 1 to channel n, multiplexing means for multiplexing a multiplexer that multiplexes the formatted signal, and transmitting means for transmitting a transmitter that transmits the multiplexed signal, the receiving apparatus comprising:
    separating means for separating a separator to separate the received signal;
    detecting means for detecting a detector to detect a beginning data of each of the section 1 to the section n from the separated signals;
    a second record medium on which the beginning data of each of the section 1 to the section n is written to channel 1 to channel n, respectively;
    reading means for a reader to successively reading read data of the section 2 to the section n from said second record medium after the beginning data of the section 1 is detected, the data of the section 1 is written to said second record medium starting from the beginning data of the section 1, the data of the section 1 is read from said second record medium, and the data of the section 1 n is read from said second record medium; and
    reproducing means for reproducing a content program reproduction apparatus to reproduce the data of the section 1 to the section n that has been read from said second record medium,
    wherein when the content program is divided so that a ratio of the lengths of the section 1 to the section m (where 1<m<n; m is an integer) become is 1, 2, 4, . . . ,$2^{(M-1)}$, respectively, and that the length of each of the section m to the section n is the same as the length of the section m, said second record medium has a capacity for which the total of the lengths of the section 1 to the section m and the length of the section 1 can be written.

10. The receiving apparatus as set forth in claim 9, wherein said detecting means detector detects bit 1 to bit n corresponding to the section 1 to the section n of flag data contained in the signal so as to detect whether or not beginning data of the section 1 to the section n are present.

11. A receiving method for receiving a signal from a transmitting apparatus and reproducing the received signal, the transmitting apparatus having a first record medium on which at least one content program has been written, a section generating means for generating generator that divides the content program into sections, section 1 to section n (where n is an integer) in such a manner that when the content program is divided into the section 1 to the section n in a predetermined ratio, the length of a section on the beginning side is smaller than the length of a section on the end side section n is longer than the length of section 1, a signal formatting means for formatting formatter that formats a signal in such a manner that the length of data of each of the section 1 to the section n is the same in each of channel 1 to channel n, multiplexing means for multiplexing a multiplexer to multiplex the formatted signal, and transmitting means for transmitting a transmitter to transmit the multiplexed signal, the receiving method comprising the steps of:
    separating the received signal;
    detecting beginning data of each of the section 1 to the section n from the separated signals;
    writing the beginning data of each of the section 1 to the section n to channel 1 to channel n, respectively, to a second record medium;
    successively reading data of the section 2 to the section n from the second record medium after the beginning data of the section 1 is detected, the data of the section 1 is written to the second record medium starting from the beginning data of the section 1, the data of the section 1 is read from the second record medium, and the data of the section 1 n is read from the second record medium; and
    reproducing the data of the section 1 to the section n that has been read from the second record mediuin,
    wherein when the content program is divided so that a ratio of the lengths of the section 1 to the section m (where 1<m<n; m is an integer) become is 1, 2, 4, . . . , $2^{(m-1)}$, respectively, and that the length of each of the section m to the section n is the same as the length of the section m, the second record medium has a capacity for which the total of the lengths of the section 1 to the section m and the length of the section 1 can be written.

12. The receiving method as set forth in claim 11, wherein bit 1 to bit n corresponding to the section 1 to the section n of flag data contained in the signal are detected so as to detect whether or not beginning data of the section 1 to the section n are present.

13. A transmitting and receiving system having a transmitting apparatus for transmitting a content program and at least one receiving apparatus for receiving the transmitted content and reproducing the received content program, wherein the transmitting apparatus comprises:
    a first record medium on which at least one content program has been written is stored;
    generating means for generating a section generator that divides the content program into sections, section 1 to section n (where n is an integer) in such a manner that when the content program is divided into the section 1 to the section n in a predetermined ratio, the length of a section on the beginning side is smaller than the length of a section on the end side section n is longer than the length of section 1;
    signal formatting means for formatting a signal formatter that formats a signal in such a manner that the length of data of each of the section 1 to the section n is the same in each of channel 1 to channel n;
    multiplexing means for multiplexing a multiplexer to multiplex the signal formatted by the signal formatter; and
    transmitting means for transmitting a transmitter to transmit the multiplexed signal,
    wherein the receiving apparatus comprises:
    separating means for separating a separator to separate the received signal;
    detecting means for detecting a detector to detect a beginning data of each of the section 1 to the section n from the separated signals;

a second record medium on which the beginning data of each of the section 1 to the section n is written to channel 1 to channel n, respectively;

reading means for a reader to successively reading read data of the section 2 to the section n from said second record medium after the beginning data of the section 1 is detected, the data of the section 1 is written to said second record medium starting from the beginning data of the section 1, the data of the section 1 is read from said second record medium, and the data of the section 1 n is read from said second record medium; and reproducing means for reproducing a content program reproduction apparatus to reproduce the data of the section 1 to the section n that has been read from said second record medium, wherein the transmitting apparatus transmits the content program that has been divided by n to the receiving apparatus through a transmission line, and wherein when the receiving apparatus detects beginning data of the received content program, the receiving apparatus reproduces the content program, wherein said section generating means generator divides the content program so that a ratio of the lengths of the section 1 to the section m (where 1<m<n; m is an integer) become is 1, 2, 4, . . . , $2^{(m-1)}$, respectively, and that the length of each of the section m to the section n is the same as the length of the section m.

14. The transmitting and receiving system as set forth in claim 13, wherein said signal formatting means formatter repeats data of each of the section 1 to the section m−1 so that the length of each of signals of the channel 1 to the channel m−1 (where 1<m<n; m is an integer) is the same as the length of a signal of the channel m and that the length of each of the signals of the channel m to the channel n is the same as the length of the signal of the channel m.

15. The transmitting and receiving system as set forth in claim 13, wherein said multiplexing means multiplexer multiplexes synchronous data, flag data, and the data of the section 1 to the section n, the synchronous data being used to establish a synchronization, the flag data representing that beginning data is contained in each of the section 1 to the section n.

16. The transmitting and receiving system as set forth in claim 13, wherein the multiplexed signal is modulated.

17. The transmitting and receiving system as set forth in claim 13, wherein said detecting means detector detects bit 1 to bit n corresponding to the section 1 to the section n of flag data contained in the signal so as to detect whether or not beginning data of the section 1 to the section n are present.

18. The transmitting and receiving system as set forth in claim 13, wherein when the content program is divided so that a ratio of the lengths of the section 1 to the section m (where 1<m<n; m is an integer) become 1, 2, 4, . . . , $2^{(m-1)}$, respectively, and that the length of each of the section m to the section n is the same as the length of the section m, said second record medium has a capacity for which the total of the lengths of the section 1 to the section m and the length of the section 1 can be written.

* * * * *